United States Patent
Roeland et al.

(10) Patent No.: US 9,998,954 B2
(45) Date of Patent: Jun. 12, 2018

(54) METHOD AND APPARATUS FOR RELOCATING PACKET PROCESSING FUNCTIONS

(71) Applicant: Telefonaktiebolaget L M Ericsson (Publ), Stockholm (SE)

(72) Inventors: Dinand Roeland, Sollentuna (NL); Conny Larsson, Åkersberga (SE); Gunnar Mildh, Sollentuna (SE); Johan Rune, Lindigö (SE); Zoltán Turányi, Szentendre (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/421,640

(22) PCT Filed: Dec. 19, 2014

(86) PCT No.: PCT/EP2014/078859
§ 371 (c)(1),
(2) Date: Feb. 13, 2015

(87) PCT Pub. No.: WO2016/096052
PCT Pub. Date: Jun. 23, 2016

(65) Prior Publication Data
US 2017/0339600 A1 Nov. 23, 2017

(51) Int. Cl.
*H04W 28/02* (2009.01)
*H04W 28/12* (2009.01)
(Continued)

(52) U.S. Cl.
CPC ............. *H04W 28/12* (2013.01); *H04L 45/38* (2013.01); *H04L 47/76* (2013.01);
(Continued)

(58) Field of Classification Search
None
See application file for complete search history.

(56) References Cited

U.S. PATENT DOCUMENTS 9,179,007 B1 * 11/2015 Yadav .................. H04M 15/66
9,288,148 B1 * 3/2016 Krishnaswamy ... H04L 41/0893
(Continued)

FOREIGN PATENT DOCUMENTS

WO WO2013172107 * 11/2013

OTHER PUBLICATIONS

Elmroth, E., et al., "Interfaces for Placement, Migration, and Monitoring of Virtual Machines in Federated Clouds", Grid and Cooperative Computing, 2009, GCC '09, Eighth International Conference on, IEEE, Piscataway, NJ, USA, Aug. 27, 2009 (Aug. 27, 2009), pp. 253-260, XP031542051.

(Continued)

*Primary Examiner* — Steven H Nguyen
(74) *Attorney, Agent, or Firm* — Rothwell, Figg, Ernst & Manbeck, P.C.

(57) ABSTRACT

The invention relates to a method for enabling relocation of a function for processing data packets of a flow associated with a device. The method is performed in an arrangement of a communication system, which is allocated as a proxy for control messages exchanged between an instance of the function for processing the data packets of the flow and a control instance controlling how the function processes the data packets of the flow. The method comprises obtaining (920) information indicating that the function for processing the data packets is relocated from a first instance to a second instance. The method further comprises forwarding (930) control messages received from the control instance to the (Continued)

second instance of the function for processing the data packets and vice versa, in response to the obtained information.

35 Claims, 21 Drawing Sheets

(51) Int. Cl.
| | |
|---|---|
| *H04L 12/721* | (2013.01) |
| *H04L 12/917* | (2013.01) |
| *H04W 40/20* | (2009.01) |
| *H04W 76/04* | (2009.01) |

(52) U.S. Cl.
CPC ....... *H04W 28/0273* (2013.01); *H04W 40/20* (2013.01); *H04W 76/041* (2013.01)

(56) References Cited

U.S. PATENT DOCUMENTS

| | | | | |
|---|---|---|---|---|
| 2013/0336286 A1* | 12/2013 | Anschutz | ............ | H04W 36/08 370/331 |
| 2014/0259012 A1* | 9/2014 | Nandlall | ............ | H04W 4/003 718/1 |
| 2015/0058966 A1* | 2/2015 | Pourzandi | ............ | H04L 63/02 726/11 |
| 2015/0103743 A1* | 4/2015 | Tamura | ............ | H04W 40/02 370/328 |
| 2015/0139075 A1* | 5/2015 | Bosch | ............ | H04L 65/105 370/328 |
| 2015/0141009 A1* | 5/2015 | Tamura | ............ | H04W 40/38 455/435.1 |
| 2015/0142958 A1* | 5/2015 | Tamura | ............ | H04L 67/1008 709/224 |
| 2016/0072713 A1* | 3/2016 | Mhatre | ............ | H04L 47/125 709/235 |
| 2016/0094641 A1* | 3/2016 | Rahman | ............ | H04L 67/1012 718/1 |
| 2016/0100330 A1* | 4/2016 | Broustis | ............ | H04L 45/74 370/237 |
| 2016/0234673 A1* | 8/2016 | Fujinami | ............ | H04W 36/0033 |
| 2016/0277509 A1* | 9/2016 | Qiang | ............ | H04L 67/16 |
| 2016/0344621 A1* | 11/2016 | Roeland | ............ | H04L 41/12 |
| 2016/0345238 A1* | 11/2016 | Roeland | ............ | H04W 36/0011 |
| 2017/0251514 A1* | 8/2017 | Soderlund | ............ | H04W 76/041 |

OTHER PUBLICATIONS

Taleb, T. et al., "Follow-Me Cloud: An OpenFlow-Based Implementation", 2013 IEEE International Conference on Green Computing and Communications and IEEE Internet of Things and IEEE Cyber, Physical and Social Computing, IEEE, Aug. 20, 2013 (Aug. 20, 2013), pp. 240-245, XP032530729.

Costa-Requena, J., "SDN integration in LTE mobile backhaul networks", The International Conference on Information Networking 2014 (ICOIN2014), IEEE, Feb. 10, 2014 (Feb. 10, 2014), pp. 264-269, XP032586981.

International Search Report and Written Opinion dated Sep. 29, 2015 in International Application No. PCT/EP2014/078859, 9 pages.

* cited by examiner

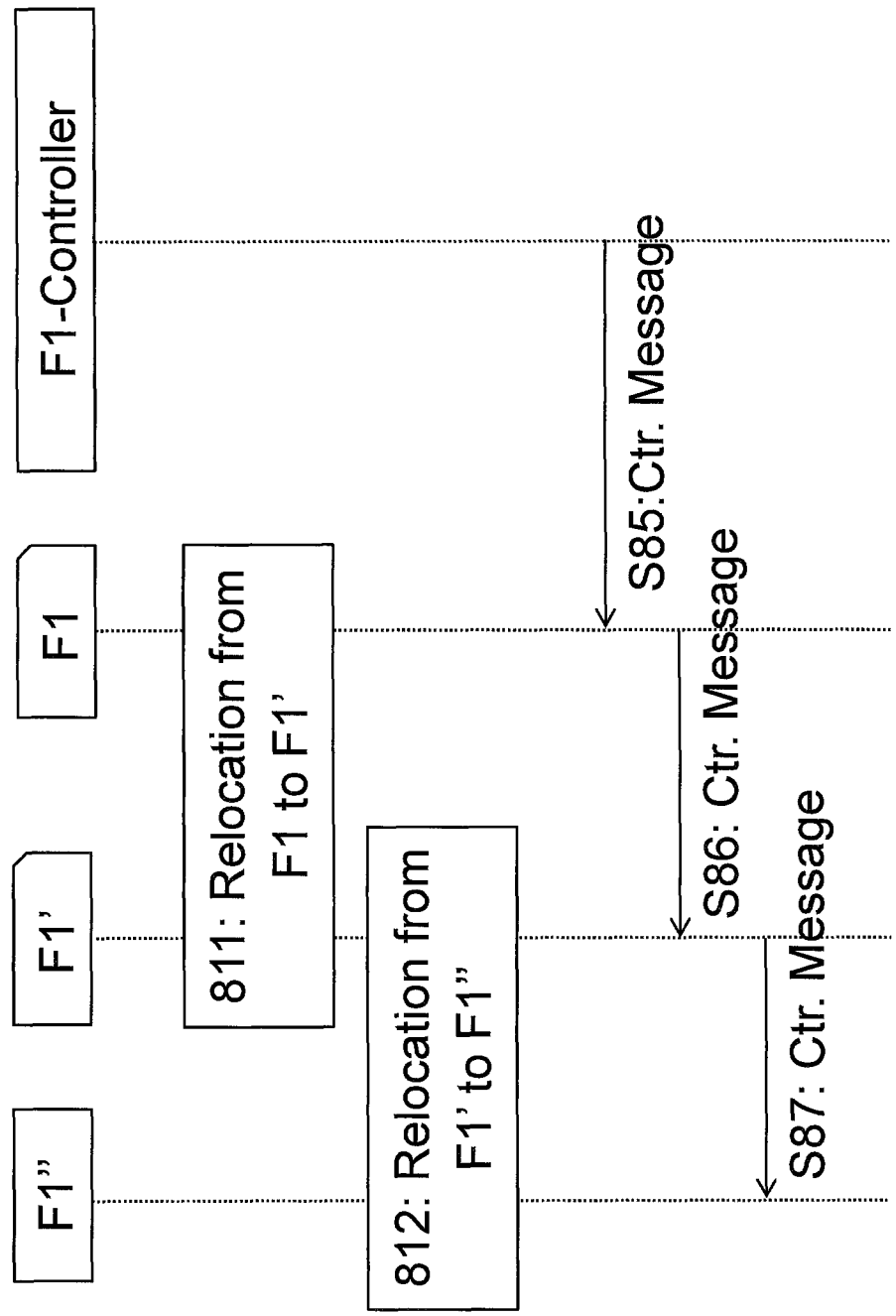

METHOD AND APPARATUS FOR RELOCATING PACKET PROCESSING FUNCTIONS

CROSS REFERENCE TO RELATED APPLICATION

This application is a 35 U.S.C. 371 National Phase Entry Application from PCT/EP2014/078859, filed Dec. 19, 2014, the disclosure of which is incorporated herein in its entirety by reference.

TECHNICAL FIELD

The disclosure relates to relocation of a function for processing data packets. The disclosure relates more specifically to methods and apparatus for enabling relocation of a function for processing data packets of a flow associated with a device.

BACKGROUND

Long Term Evolution (LTE) is the fourth-generation (4G) wireless communication technologies standard developed within the $3^{rd}$ Generation Partnership Project (3GPP) to improve the Universal Mobile Telecommunication System (UMTS) standard. The Evolved Universal Terrestrial Radio Access Network (E-UTRAN) is the RAN of an LTE system. In an E-UTRAN, a User Equipment (UE) is wirelessly connected to a Base Station (BS) commonly referred to as an evolved NodeB (eNodeB or eNB) in LTE. A BS is a general term for a network node capable of transmitting radio signals to a wireless device and receiving signals transmitted by the wireless device.

System Architecture Evolution (SAE) is the core network architecture of 3GPP's LTE wireless communication standard. The SAE has a flat, all-Internet Protocol (IP) architecture with separation of control plane and user plane/data traffic. The main component of the SAE architecture is the Evolved Packet Core (EPC), also known as SAE Core. Some important subcomponents of the EPC are Mobility Management Entity (MME) which is the key control node for the LTE access-network, Serving Gateway (SGW) which routes and forwards user data packets, Packet data network Gateway (PGW) providing connectivity from the UE to external packet data networks by being the point of exit and entry of traffic for the UE and acting as the mobility anchor for the user plane during inter-eNodeB handovers and as the anchor for mobility between LTE and other 3GPP technologies, and Home Subscriber Server (HSS) which is a central database that contains user-related and subscription-related information.

A communications network, which may be a wireless communication network, can be viewed in many ways. One way is a deployment view, where deployment refers to the physical placement of network equipment. Equipment is placed at sites. FIG. 1a shows such sites and how they may be connected.

End user devices are not illustrated in FIG. 1a. However, a device may be connected to the network, e.g., via a base station illustrated by an antenna icon, via a small cell and distributed radio (DR), or via a fixed line or a WiFi link illustrated in the FIG. 1a by a house icon or an office icon. Traffic is carried through an aggregation network, where Ac in the FIG. 1a is used for access sites and Ag is used for aggregation sites. Access and aggregations sites are often called hub sites or central office sites. Further aggregation may be done through a backbone network (BB) towards centralized data centers (DC). Some of these data centers may also act as a primary site (P). Some data centers, illustrated as the globe icons in FIG. 1a, may also do peering towards external Internet. Note that site naming is not standardized and may differ between operators. The naming above is just one example.

The deployment may be visualized in another way, illustrated in FIG. 1b. Different network services are mapped to different sites in this view. The services are here the network nodes of the 3GPP Evolved Packet Core (EPC) architecture as defined in the 3GPP standard (TS 23.401). Local sites may host antennas and eNBs. Regional sites are mainly used for aggregation. National sites host core network nodes like MME, SGW, PGW and Policy and Charging Control Function (PCRF). Some national sites may act as primary sites hosting user subscription information in a HSS.

To give an example, a large operator with more than 100 million subscribers spanning a large country may have 50000 BS sites, 150 central office sites, 25 regional data centers and 5 national data centers where each national data center also does peering towards external Internet. A BS site spans a couple of thousands of end users in a city district, a central office site spans a larger city, a regional data center spans a few million users in a part of a large state or in a number of small states, and a national data center spans tens of millions of users in a complete region of the country.

The current 3GPP EPC architecture is an anchored architecture. This means that all traffic of an Access Point Name (APN) of a user device needs to pass through one and the same PGW. With such architecture and a deployment as described above, it will be clear that the traffic in the network will follow a topological tree structure. The leaves of the tree are the end devices, the branches are the local and regional sites, and the trunk is the national data center hosting the PGW. Traffic from one end device to another end device will have to pass at least one, sometimes even two, PGWs. This also means that there may be a large latency in the transport of the packets, even if the two end devices are physically close to each other. The PGW may be hosted in a national data center physically far from the end devices. This applies also when one of the devices is located in another network, e.g. a server on the Internet.

IP networks use address aggregation to achieve routing scalability. This results in IP addresses having location significance in the network. That is, when a device with an IP address moves, it is not easy to reflect the change of the location of its IP address in the routing system. This is usually solved by allocating a fixed-location anchor point to the device managing its IP address. The anchor would then tunnel the traffic incoming to the device to the current location of the device. Mobile IP or General Packet Radio Service (GPRS) Tunneling Protocol (GTP) are protocols doing this. In the following, the place in the network topology where the IP address of the device is advertised is called an IP Advertisement Point (IAP). In today's mobile and fixed networks the IAP of the end user device, sometimes referred to as the UE, is typically anchored in a node as already mentioned above. In an anchored architecture, the IAP acts as anchor and is located in e.g. the PGW or a Broadband Network Gateway (BNG) for as long as the UE is using that IP address. The UE may e.g. use the IP address until the UE detaches or the IP address is released or re-assigned e.g. using Dynamic Host Configuration Protocol (DHCP).

All incoming traffic to the UE needs to go through the IAP, meaning the placement of the IAP in relation to the UE and its communication peer will determine how optimal the packet routing will be towards the UE. I.e. if the IAP is placed close to the UE, traffic from different sources can take a fairly optimal route to the IAP and the UE, if the IAP is far away from the UE, e.g. located on some core site, the traffic routing will often be less optimal. The drawback though of placing the IAP more distributed, i.e. closer to the UE, appears when the devices such as a wireless UE moves in the network. At that time the routing, although initially optimal, could become sub-optimal after some UE mobility. This is illustrated in the FIGS. 2a-d. In FIG. 2a, the IAP is placed in a central location. Routing of IP flow 1 is optimal but routing of IP flow 2 is sub-optimal. In FIG. 2b, the IAP is placed in a distributed location, leading to more efficient routing for both flows in the static case, i.e. when the UE is not moving. However, in FIG. 2c the IAP is also placed in a distributed location, leading to less efficient routing for both flows in the case of a mobile UE, and in FIG. 2d, the IAP is again placed in a central location, which in the mobility case leads to a more efficient routing for both flows in this example.

FIGS. 2a-2d thus illustrates how the placement of the anchor point or the IAP can support optimized routing. Moving an anchor is not possible. However, multiple IAPs may announce the same IP address. In such anchorless setup, optimized routing can be achieved by using that IAP that is on the optimal routing path. There may be one or more functions for processing data packets of a flow associated with a device or UE which are on the routing path UE-IAP-peer. If the data packets of the flow after movement of the UE start to go through a different path, and possibly via a different IAP, then those functions may still be on a sub-optimal routing path. A mechanism is needed to address that problem. Hereinafter, the term functions for processing data packets is equivalent to the term user plane packet processing functions sometimes simply referred to as packet processing functions. Examples of packet processing functions are firewall, Network Address Translation (NAT), charging functions, policy functions, and lawful interception function.

SUMMARY

It is therefore an object to address some of the problems outlined above, and to provide a solution for enabling relocation of a function for processing data packets of a flow associated with a device, without impacting a control instance controlling how the function processes the data packets of the flow. This object and others are achieved by the methods and apparatus according to the independent claims, and by the embodiments according to the dependent claims.

In accordance with a first aspect, a method for enabling relocation of a function for processing data packets of a flow associated with a device is provided. The method is performed in an arrangement of a communication system. The arrangement is allocated as a proxy for control messages exchanged between an instance of the function for processing the data packets of the flow and a control instance controlling how the function processes the data packets of the flow. The method comprises obtaining information indicating that the function for processing the data packets is relocated from a first instance to a second instance. The method further comprises forwarding control messages received from the control instance to the second instance of the function for processing the data packets and control messages received from the second instance of the function for processing the data packets to the control instance, in response to the obtained information.

In accordance with a second aspect, a method for enabling relocation of a function for processing data packets of a flow associated with a device configured to operate in a communication system is provided. The method is performed in an apparatus of the communication system. The apparatus controls the relocation of the function for processing the data packets. The apparatus is connected to a arrangement allocated as a proxy for control messages exchanged between an instance of the function for processing the data packets and a control instance controlling how the function processes the data packet. The method comprises instructing a first instance of the function for processing the data packets to relocate the function to a second instance. The method also comprises transmitting information to the arrangement indicating that the function for processing the data packets is relocated from the first instance to the second instance. The method further comprises transmitting information to the second instance of the function for processing the data packets, the information identifying the arrangement allocated as the proxy.

In accordance with a third aspect, a method for enabling relocation of a function for processing data packets of a flow associated with a device configured to operate in a communication system is provided. The method is performed in a first instance of the function for processing the data packets of the flow. The method comprises transmitting information to an arrangement indicating that the arrangement is allocated as a proxy for control messages exchanged between the first instance and a control instance controlling how the function processes the data packet. The method also comprises receiving an instruction to relocate the function for processing the data packets to a second instance, the instruction being received from an apparatus controlling the relocation. The method further comprises transmitting information to the second instance of the function for processing the data packets, the information identifying the arrangement allocated as the proxy.

In accordance with a fourth aspect, an arrangement for a communication system is provided. The arrangement is configured to enable relocation of a function for processing data packets of a flow associated with a device. The arrangement is configured to be allocated as a proxy for control messages exchanged between an instance of the function for processing the data packets of the flow and a control instance controlling how the function processes the data packets of the flow. The arrangement is further configured to obtain information indicating that the function for processing the data packets is relocated from a first instance to a second instance. The arrangement is also configured to forward control messages received from the control instance to the second instance of the function for processing the data packets and control messages received from the second instance of the function for processing the data packets to the control instance, in response to the obtained information.

In accordance with a fifth aspect, an apparatus for a communication system is provided. The apparatus is configured to enable relocation of a function for processing data packets of a flow associated with a device configured to operate in the communication system. The apparatus is configured to control the relocation of the function for processing the data packets. The apparatus is connectable to an arrangement allocated as a proxy for control messages exchanged between an instance of the function for processing the data packets and a control instance controlling how the function processes the data packet. The apparatus is further configured to instruct a first instance of the function for processing the data packets to relocate the function to a second instance, and transmit information to the arrangement indicating that the function for processing the data packets is relocated from the first instance to the second instance. The apparatus is further configured to transmit information to the second instance of the function for processing the data packets, the information identifying the arrangement allocated as the proxy.

In accordance with a sixth aspect, a first instance of a function for processing the data packets of a flow associated with a device configured to operate in a communication system is provided. The first instance is configured to enable relocation of the function for processing data packets of a flow. The first instance is further configured to transmit information to an arrangement indicating that the arrangement is allocated as a proxy for control messages exchanged between the first instance and a control instance controlling how the function processes the data packet. The first instance is also configured to receive an instruction to relocate the function for processing the data packets to a second instance, the instruction being received from an apparatus controlling the relocation. The first instance is further configured to transmit information to the second instance of the function for processing the data packets, the information identifying the arrangement allocated as the proxy.

In accordance with further aspects, computer programs are provided. The computer programs comprise computer readable code which when run on the apparatus according to the respective fourth, fifth and sixth aspects causes the apparatus to perform methods in accordance with the respective first, second, and third aspects above. Computer program products are also provided, each comprising a computer readable medium and one of the computer programs stored on the computer readable medium.

An advantage of the different aspects above is that it is possible to introduce relocation of functions for processing data packets of a flow in order to support optimized routing, without impacting the controllers of the functions. This will in turn reduce the cost and complexity of introducing relocation of functions.

Other objects, advantages and features of embodiments will be explained in the following detailed description when considered in conjunction with the accompanying drawings and claims.

BRIEF DESCRIPTION OF THE DRAWINGS

FIGS. 8b-c are signaling diagrams illustrating the signaling for two alternative embodiments when the source instance of a function is acting as a control plane proxy.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 3:
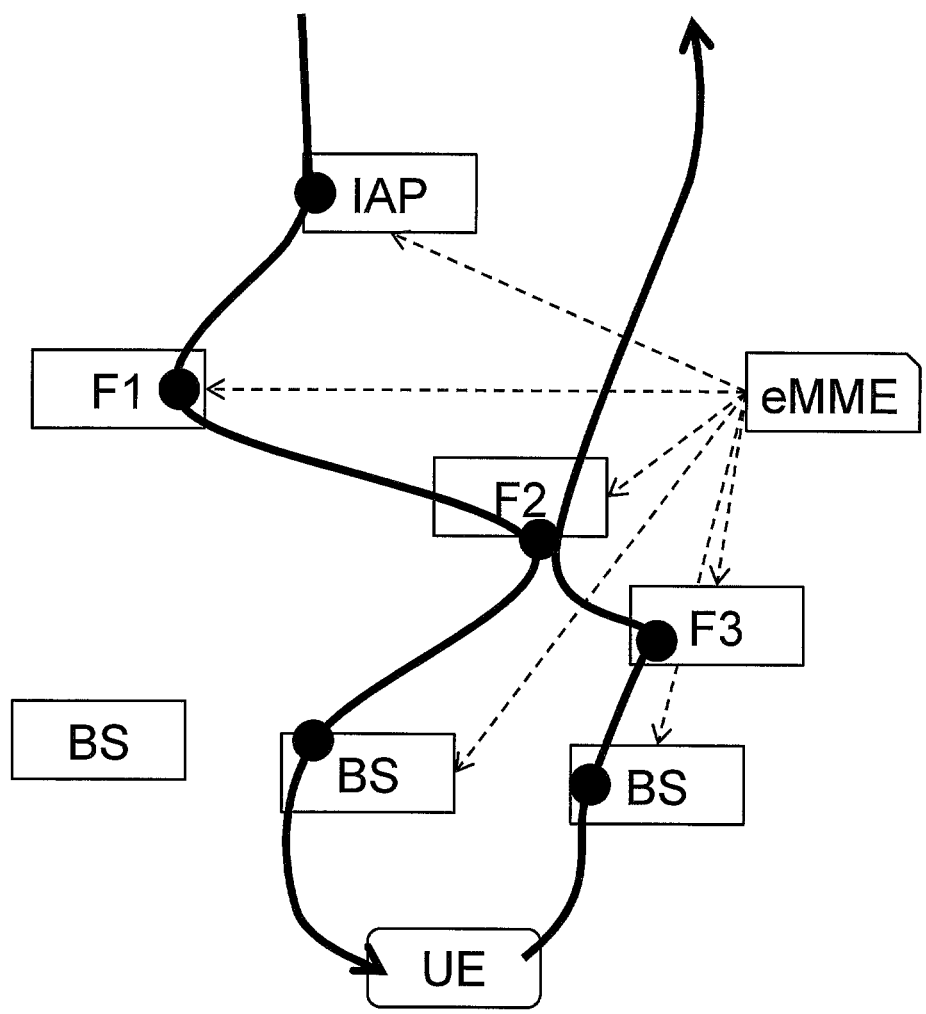
FIG. 3 is a schematic illustration of a high level overall fifth generation (5G) architecture.

Embodiments are described in a non-limiting general context in relation to an example scenario in a high level 5G network architecture in which user plane or data packet processing functionality is relocated. The high level 5G-architecture is schematically illustrated in FIG. 3, visualizing a draft version of one possible 5G-architecture. A mobile device, called UE has a radio interface with one or more BSs. The UE may exchange IP packets with a peer (not shown in FIG. 3). The peer may be on the same network, or may be in an external network, such as the Internet. The network operator domain includes, besides BSs, one or more IAPs, one or more evolved MMEs (eMME) handling all control plane related signalling and zero or more functions for processing data packets (F1, F2, F3). It should be noted that embodiments of the invention may be applied to any network architecture, so the 5G network architecture illustrated in FIG. 3 should be seen as an example. Embodiments of the invention may e.g. be applied in both wireless and fixed communication networks and for both wireless and fixed devices.

The problem of sub-optimal routing of flows that may occur for different IAP locations, e.g. when the UE is moving, may be addressed by an anchorless architecture where all packet processing functions can be relocated, even the one(s) that would normally constitute an anchor. A relocation of one or more functions for processing data packets of a flow associated with a device enables the change or relocation of the IAP for the device, in order to achieve an optimal routing of the data packets of a flow associated with a specific end user device.

In FIG. 3 described above, three packet processing functions are shown, F1, F2 and F3. For each data packet that such a function receives, the function performs some kind of processing and forwards the processed packet. Example functions include encryption/description of packets, policy and charging enforcement, deep packet inspection (DPI) and proxy functions. Functions may be chained, which means that a packet passes a function and is then forwarded to a next function of the chain. The chain of functions also comprises switching elements that routes the data packets to the correct function. These switching elements may or may not be co-located with the function. In one embodiment, the switching element bases its routing decision on routing rules and information in the header field of the packet. In other embodiments, the switching element may mark the packet in some way e.g. by adding an extra header field. Another switching element, later in the chain, will then use that marking to make its routing decision.

Chains of functions may be valid on various granularities, e.g. for a group of UEs, on a per-UE basis, or on a per-flow basis. The flow is defined by its five-tuple, i.e. source and destination IP addresses in the IP header, protocol field in the IPv4 header or next header field in the IPv6 header, and source and destination port numbers in the transport protocol header. The transport protocol may be Transmission Control Protocol (TCP), User Datagram Protocol (UDP), or Stream Control Transmission Protocol (SCTP). Function chains may be symmetrical or asymmetrical. In the symmetrical chain the same functions are passed in uplink and in downlink. The example in FIG. 3 shows a dual-radio UE with an asymmetrical chain, where functions F3 and F2 are passed in the uplink and functions F1 and F2 are passed in the downlink. In the uplink, the last function in the chain forwards the packet as a plain IP packet.

In the example scenario, function chains are set up and controlled by the eMME. The setup of a chain could be performed when the UE attaches to the network or when a new flow is started. A function chain for an aggregate of UEs can also be setup before the UEs' attach to the network. The functions may be part of a Software Defined Networking (SDN) environment and the eMME may act as an SDN controller.

The UE's IP address topologically belongs to one or more IAPs. This implies that each IP packet sent from the peer to the UE will pass one such IAP. The function of the IAP is to forward the packet to the first function in the downlink chain.

Initial Attach in the High-Level Architecture

Figure 4:
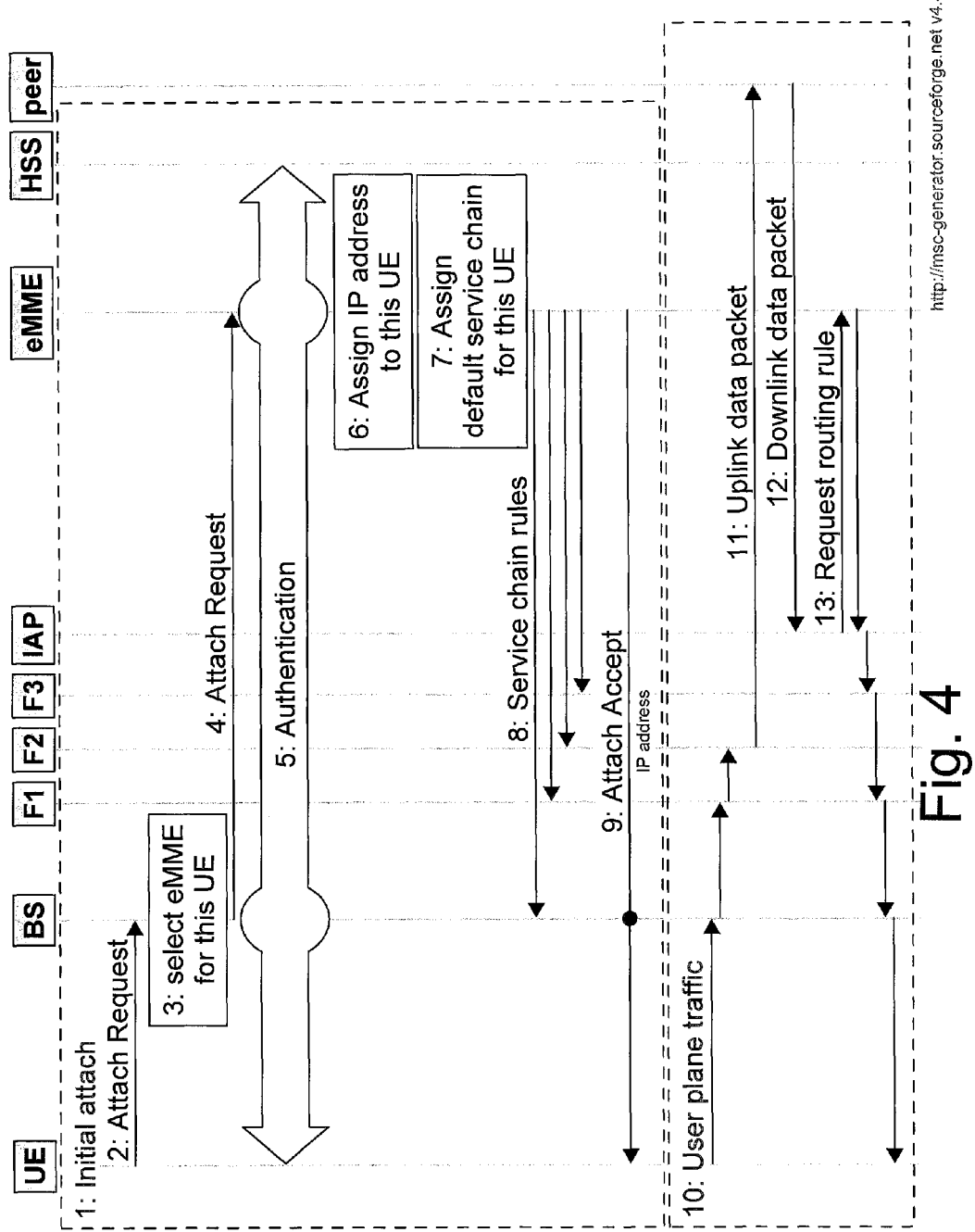
FIG. 4 is a signaling diagram illustrating the initial attach procedure in a network based on the high level 5G architecture.

The signaling diagram or call flow in FIG. 4 illustrates how an initial attach procedure is performed in a communication network based on the high-level architecture. In this example the UE attaches to a single BS. The chain of functions, also referred to as the service chain, for uplink packets comprises F1 and F2, and the service chain for downlink packets comprises F3 and F1. The service chain also comprises switching element that affects the routing of the data packets of the flow in the chain.

The BS receives the attach request message (step 2) and selects an eMME (step 3). The attach request message is then forwarded to the eMME (step 4) and an authentication is performed (step 5). The HSS may contain a user profile. After successful authentication, the eMME assigns an IP address to the UE (step 6) and sets up a default service chain (step 7-8). Every UE has a default service chain that is used for all flows to which no specific service chain is valid. At a later stage, not shown in this call flow, more specific service chains for this UE, e.g. for a single flow, may be added. Once the default service chain has been setup, the eMME sends an attach accept message to the UE (step 9). After that step, the UE may start to send uplink data (step 11) and may receive downlink data (step 12). For downlink packets, the IAP queries the eMME (step 13) to find out to which processing function to send the packet. The frequency of these requests can be optimized in several ways. E.g. the IAP can retrieve all routing rules for a particular UE or IP address and cache those.

One embodiment of the architecture shown in FIG. 3 is the existing EPC architecture, in which case the IAP, i.e. the PGW, is the only IAP that advertises the IP address for a certain UE as long as it remains attached to the network, i.e. an anchor-based architecture. Functions like Packet Data Convergence Protocol (PDCP) processing are then performed on the BS, which is called eNB. Functions like policy and charging enforcement are performed on the PGW and the forwarding between eNB and PGW is implemented using GTP tunnels. The service chains would be symmetrical. Additional functions like DPI and TCP proxying are placed "above" the PGW, i.e. after the PGW in the uplink direction.

Seen from a 5G perspective, the current EPC architecture as defined in 3GPP TS 23.401 and TS 23.402 has a number of drawbacks. One drawback is that the architecture lacks the concept of service chaining, and therefore does not provide flexible means to insert new functions in the chain or having multiple chains for a single UE. Another drawback is that all packets for a particular UE or a particular APN for a UE need to pass one and the same PGW. The PGW thus acts as an "anchor point". This may lead to sub-optimal routing.

As part of the 5G project an anchorless architecture is being studied. Another embodiment of the high-level architecture is such anchorless architecture. In that case, multiple IAPs may advertise the UE IP address into the IP routing system, so downlink packets may end up at one of several IAPs. Still each IAP would forward the packet to the first function in the downlink chain. Uplink packets sent from the last function in the chain can be routed directly to the Internet via the physically closest border router, or can be routed directly to an operator's IAP if the peer is connected to such an IAP. Different functions in the chain may be placed at different locations. In one scenario all functions could be co-located on the BS. In this way the most optimal routing would be achieved. In another scenario it may not be feasible to always place all functions on the BS. Some functions may be placed at a more central place in the network; e.g. in a regional or even a national data center site. At the setup time of the service chain, the eMME may find a service chain that provides an optimal route through the network. It should be noted that other traffic flows involving the same UE may pass through a different IAP and different service chains and different function locations may be used for these flows, e.g. in order to achieve optimal routing also for these flows.

Even if functions in an anchorless architecture are initially placed to achieve optimal routing, if the UE moves to another BS and the packet processing functions do not move, the route may become sub-optimal. Current virtualization and networking technologies do not provide a means to relocate a specific packet processing function from one instance to another instance for a service chain specific to a single end user. A function defines what to do with a packet. A function instance is executing the function at a specific location in the network deployment.

Generic Relocation Method

Figure 5A:
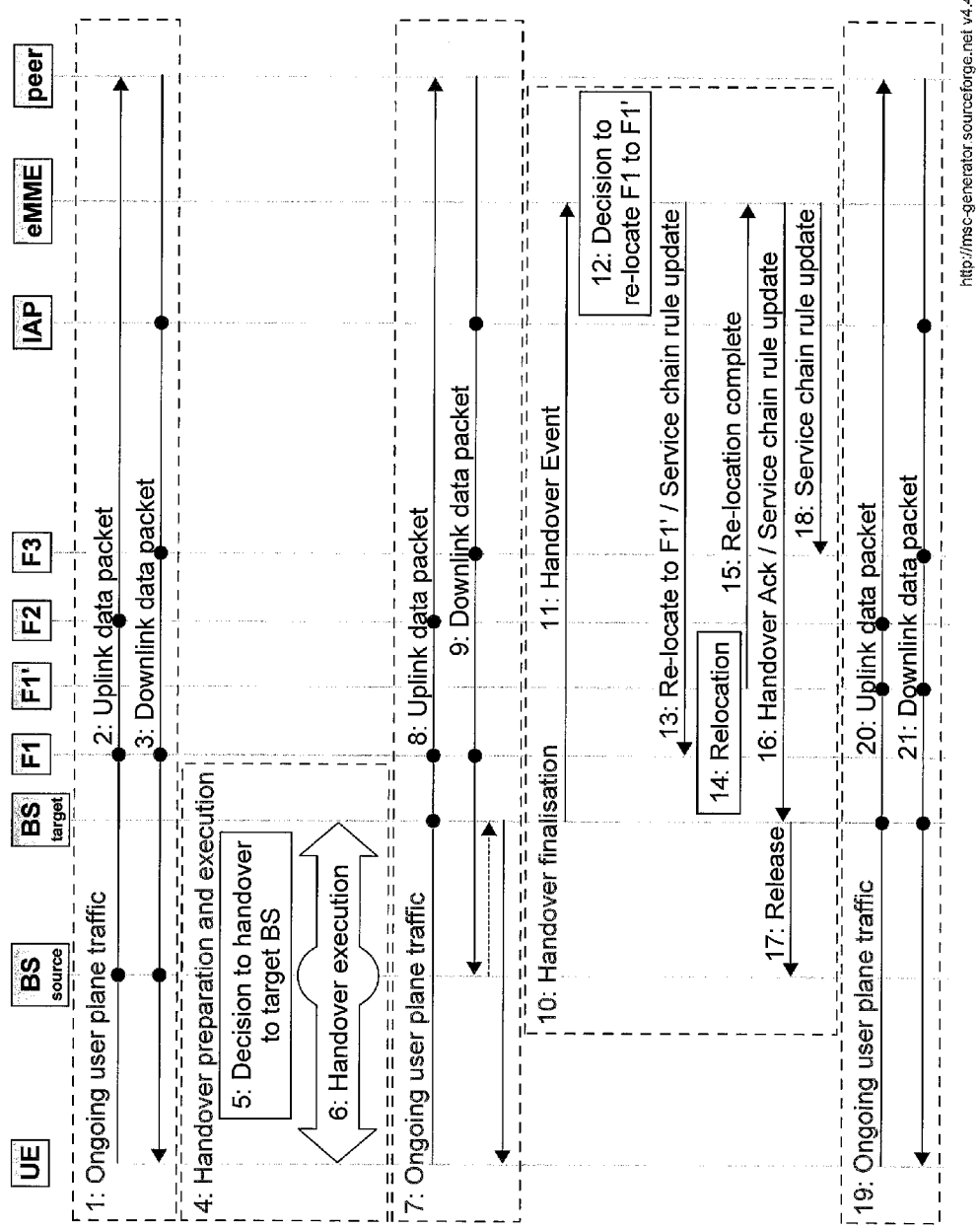
FIGS. 5a-b are signaling diagrams illustrating relocation methods.

The signaling diagram or call flow in FIG. 5a illustrates a generic relocation method procedure in the context of an inter-BS radio handover. The relocation method is part of block 10 which describes the handover finalization. The event that is triggering relocation is a handover of the UE from one BS to another. Other triggers are also possible, which will be further described below. The service chain consists of the same functions as those in the initial attach example. The handover, block 4, corresponds to the "X2-based handover" as defined in 3GPP TS 23.401.

In block 10, function F1 is relocated to a target instance of that same function. This target instance is denoted F1'. One way to relocate multiple functions would be to perform block 10 once for each function.

The eMME decides to relocate F1 to F1' (step 12) and instructs F1 to do a relocation (step 13). In the latter step the eMME also informs F1 about a service chain rule update, i.e., that downlink packets are to be sent to the target BS instead of to the source BS. The service chain rule update thus comprises an update of one or more switching elements in the chain of functions for processing the data packets of the flow. The switching elements are updated with information related to the relocated function. The actual relocation of the function is step 14. Multiple methods are possible here, and these are explained in subsequent sections. As part of step 14, F1 informs F1' of the now updated downlink service chain rule.

Once the relocation is done, F1' informs the eMME (step 15). The eMME then updates the proceeding and succeeding functions in the uplink service chain; the target BS is informed to send uplink data to F1' instead of to F1 (step 16), and F3 is informed to send downlink data to F1' instead of to F1 (step 18). The order in which 16 and 18 are performed is irrelevant.

To assist F1' in handling packets in-order, the "end marker" solution used for user plane forwarding at handovers in Evolved Packet System (EPS) can be reused here. E.g. in downlink, F3 can send an end marker to F1 right after the chain update (step 18). F1 forwards the end marker to F1'. After that, provided that F1 has no more uplink data to forward to either F3 or F1', F1 can also release its context. Alternatively, F1' can request F1 to release its context when F1' has received the end marker, either immediately upon receiving the end marker or a certain time after the reception of the end marker.

Step 16 may also serve as an acknowledgement to step 11. Such acknowledgement could then also trigger an explicit release message to the source BS (step 17). Alternatively, the release of the source BS is done implicitly by letting F1 send an end marker to the source BS.

Specific Methods to Relocate a Function

Hereinafter, example embodiments of relocation methods are described. They thus describe how step 14 in the call flow in FIG. 5a can be performed. There may be more examples of such relocation methods. Furthermore, the methods may be combined. As one example, one relocation method may be used for one subset of the flows in the chain, and another relocation method may be used for another subset of the flows in the chain. The eMME may instruct the function to use a specific relocation method. Alternatively, the function itself may decide which relocation method to use. The decision of what relocation method to use is further described below.

Figure 5B:
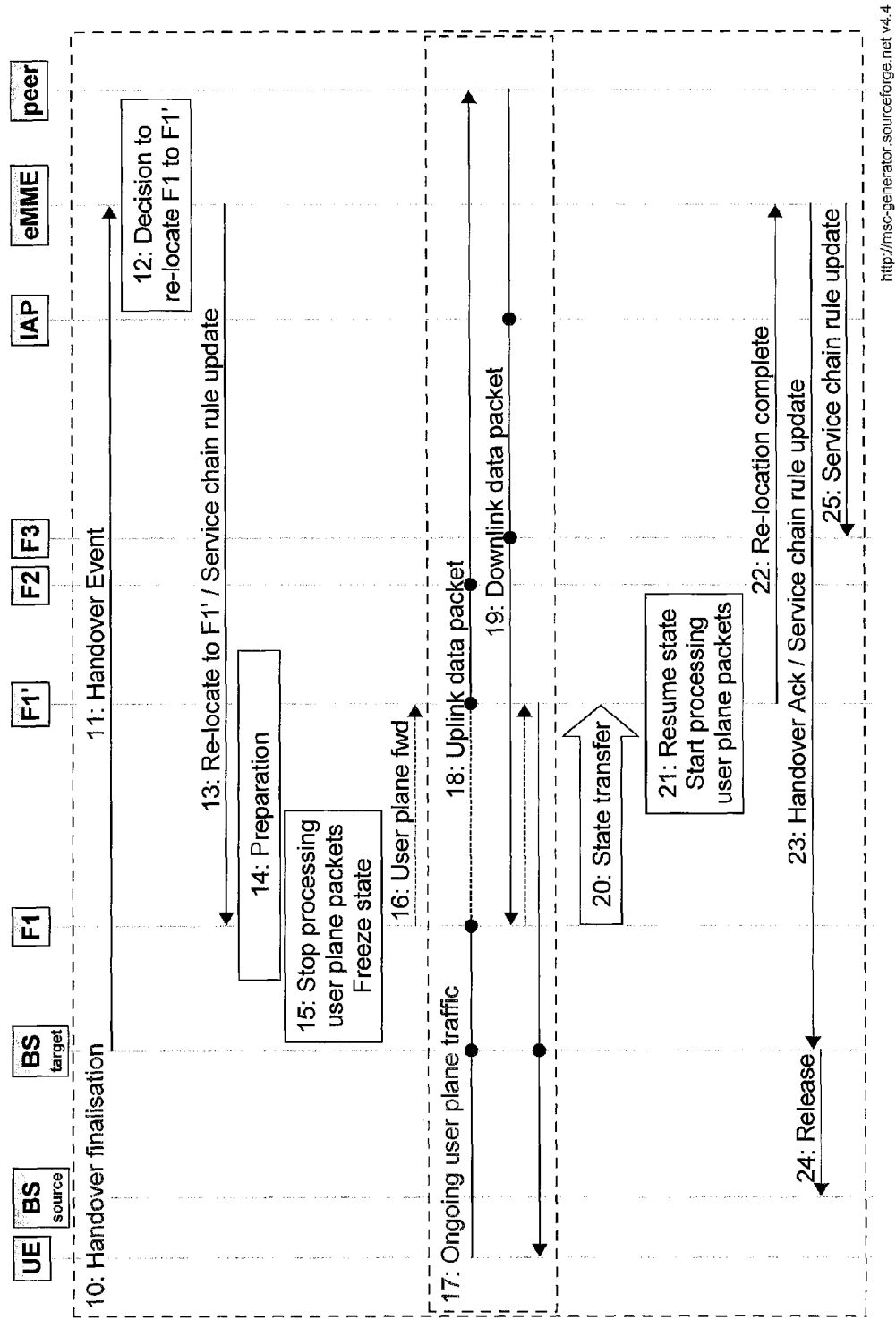

Freeze-Move-Resume Relocation Method (FIG. 5b)

The signaling diagram or call flow in FIG. 5b specifies block 10 of the generic call flow in FIG. 5a in more detail. The rest of the generic call flow remains the same.

In this relocation method, the state related to the user plane packet processing of the source instance of the function is frozen (step 15). Then all state is copied to the target instance of the function (step 20). Finally, packet processing is resumed in the target instance based on the copied state (step 21).

State involves all parameters related to the processing of the packets for this UE's service chain. Examples of such parameters include: buffered packets, counters, sequence numbers, acknowledgements, user subscription information, security keys, and timers.

Freezing state means that the function stops processing packets such that the state is no longer updated. Packets that are sent to the function while the state is frozen can be forwarded to the target instance of the function (step 16).

Before freezing the state, the source instance could run a preparation phase (step 14). It could e.g. assess how much state is to be transferred, and perform bandwidth allocation on the source-target link for the transfer. It could also select the best protocol to use for the state transfer (step 20). Different protocols may suit better in different situations. If TCP is to be used, the source could run the slow-start with bogus data or query the nodes on the source-target link and negotiate a higher initial window size. A further option is not to reserve anything, but to send the state transfer with some higher priority class, such as network control. This would be at the expense of regular network traffic. Either way, the source could calculate how long the relocation would take, and inform the eMME about this. This optional informing of the eMME could be done with a message from F1 to the eMME after step 14 (not shown in FIG. 5b). The eMME then takes the final go/no-go decision. This could be done by an explicit signaling to the eMME for every relocation, or by pre-provisioned rules previously received from the eMME.

The freeze-move-resume method is in particular beneficial if the state is fairly small and if the required bandwidth to transfer the state is small compared to bandwidth available to regular traffic, and if the relocation time can be kept short.

Pre-Copy Relocation Method

The pre-copy method is an attempt to decrease the time that user plane packets cannot be processed. In particular, it tries to decrease the time between "freeze state" and "resume state" in the freeze-move-resume approach. The idea is that while the source instance is processing packets, it continuously updates information elements in its user state. The frequency of these updates will differ per information element and will also depend on the traffic intensity and the type of traffic. A subset of the information elements, e.g. those that are not updated frequently, could be pre-copied to the target while the source continues to process packets. Once the source stops processing packets, only the updated and not-yet-copied information elements need to be transferred. The other steps are equal to the freeze-move-resume method.

A trivial approach to implement this method would be to pre-copy the entire state, then freeze, then copy the information elements that have been updated since the pre-copy. Another approach would be to base the implementation on a "distributed database", where distribution means that copies of the same information element are kept in the source and target instance. Yet another approach would be to have a classifying period before the pre-copying. The classification would result in an "update rate" on each information element. The more frequent updates, the higher the rate. Once the classification is performed, the pre-copying is only done on those elements that have an update rate below a certain threshold. Given the threshold and the available bandwidth for the transfer, the time where no user plane processing is possible can be estimated. The threshold value or the time when no processing is possible can be negotiated with the eMME.

The pre-copy method is in particular beneficial if there is a lot of state to transfer and if large parts of the state are more or less stable.

Only-New-Flows-On-Target Relocation Method

This method is an attempt to completely eliminate the time that user plane packets cannot be processed. In particular, there is no "freeze state". The idea is that existing flows, i.e. flows that are active when the function receives the relocation command from the eMME, are processed on the source instance of the function until the flow ends. Only new flows, i.e. flows that start after the relocation command from the eMME, are processed on the target instance. In this approach, the function needs to know when a flow ends. For TCP (and SCTP) this is possible by examining the packets. For UDP a time-out mechanism could be used. If no packets for this flow have passed the function during a specific time, the context is removed, which is a similar approach as in e.g. a NAT.

F1 continues to forward uplink processed packets of existing flows to F2. F1 forwards uplink packets of new flows to F1', where F1' does the processing. In the downlink, F3 continues to send all packets to F1, where F1 forwards downlink packets for new flows to F1'. This forwarding continues until the last existing flow has ended on the source. Only then the eMME is informed and can start to send service chain rule updates.

The optional steps 15 and 25 are not context transfer of user plane packets, but transfer of e.g. policy rules, charging counters, etc. Some of this state needs to be sent to the target function before it starts processing, e.g. policy rules, and some of this state can only be sent after the source has finished processing (e.g. charging counters).

The only-new-flows-on-target method is in particular beneficial if the lifetime of the existing flows is short.

Flushing Relocation Method

This method is an attempt to limit the number of buffered user plane packets that are copied to the target function as part of the state transfer. This method is in particular beneficial for functions that act as proxy, e.g. a TCP or MPTCP proxy. These functions may have large user plane packet buffers.

The idea is that for those packets the TCP or MultiPath TCP proxy receives from the UE (uplink) and the UE's peer (downlink), it sends a TCP ACK with receiver window size 0. Receiving the first ACK with window size 0 makes the UE and the peer stop sending packets, as the allowed number of outstanding bytes is the minimum of the congestion window and the receiver window, hence 0. However, there may be other packets arriving after sending the first ACK with window size 0, as the peer may have sent additional data packets, the window allowing. Reception of these packets are also acknowledged with TCP ACK with window size 0 by the TCP or MultiPath TCP proxy. Finally, the TCP or MultiPath TCP proxy will not receive any new data packets after approximately one RTT after sending the first ACK with window size 0.

The (MP)TCP proxy continues to send already buffered data to the UE (downlink) and to the peer (uplink). During this process, some data packets may arrive from the senders, as described above. There are multiple ways to handle this situation, In the first option, the TCP or MultiPath TCP proxy repeats sending a TCP ACK with receiver window size 0, and will flush those packets subsequently. Also, when sending the first TCP ACK with window size 0 the proxy starts a timer that is set to RTT or slightly larger. Before this timer expires, the relocation cannot happen, as new data packets may still arrive that needs to be flushed. In another option, the data packets arriving after the first TCP ACK with window size 0 will be part of the user plane context and will be relocated. They may or may not be acknowledged by the old TCP or MultiPath TCP proxy. As a third option, they will be forwarded on the user plane, but not via the relocation method, to the new function and buffered there. As a fourth option, they are discarded and not acknowledged by the TCP or MultiPath TCP proxy and will be re-sent by the endpoints according to the TCP algorithm at a later point after the receiver window opened again.

Eventually, all buffered packets that can be sent have been sent and the UE and the peer have acknowledged these packets. At this point in time, the relocation to the target instance is made. This step is performed using one of the previously mentioned methods, e.g. steps 14-21 in the freeze-move-resume method in FIG. 5b. After the relocation, the target instance of the proxy starts acknowledging packets to the UE and the peer with a window size >0, enabling the UE to send uplink packets and the peer downlink packets.

There may be variants to the above described procedure. The purpose, however, is that the source function empties, or "flushes", its data packet buffers before the relocation is performed. Note that in some cases it may not be possible to fully empty the buffer. E.g. in MPTCP there may be multiple subflows, and packets for one subflow are buffered because there is a dependency towards a packet on another subflow that has not yet arrived at the proxy.

Managing Control Plane Connections when Relocating User Plane Functions

Figure 1A:
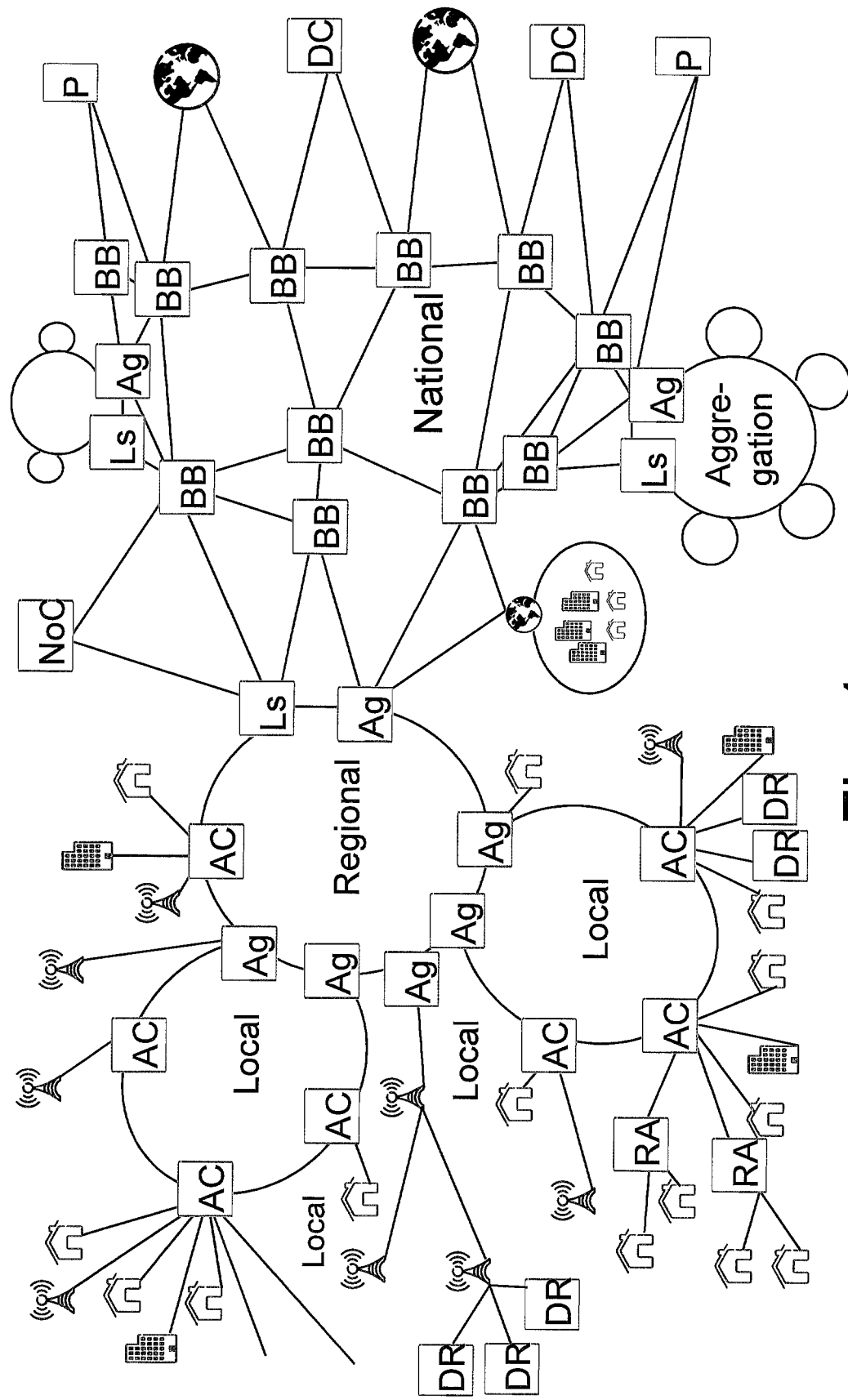
FIG. 1a is a schematic illustration of a deployment view of a communication network.
Figure 1B:
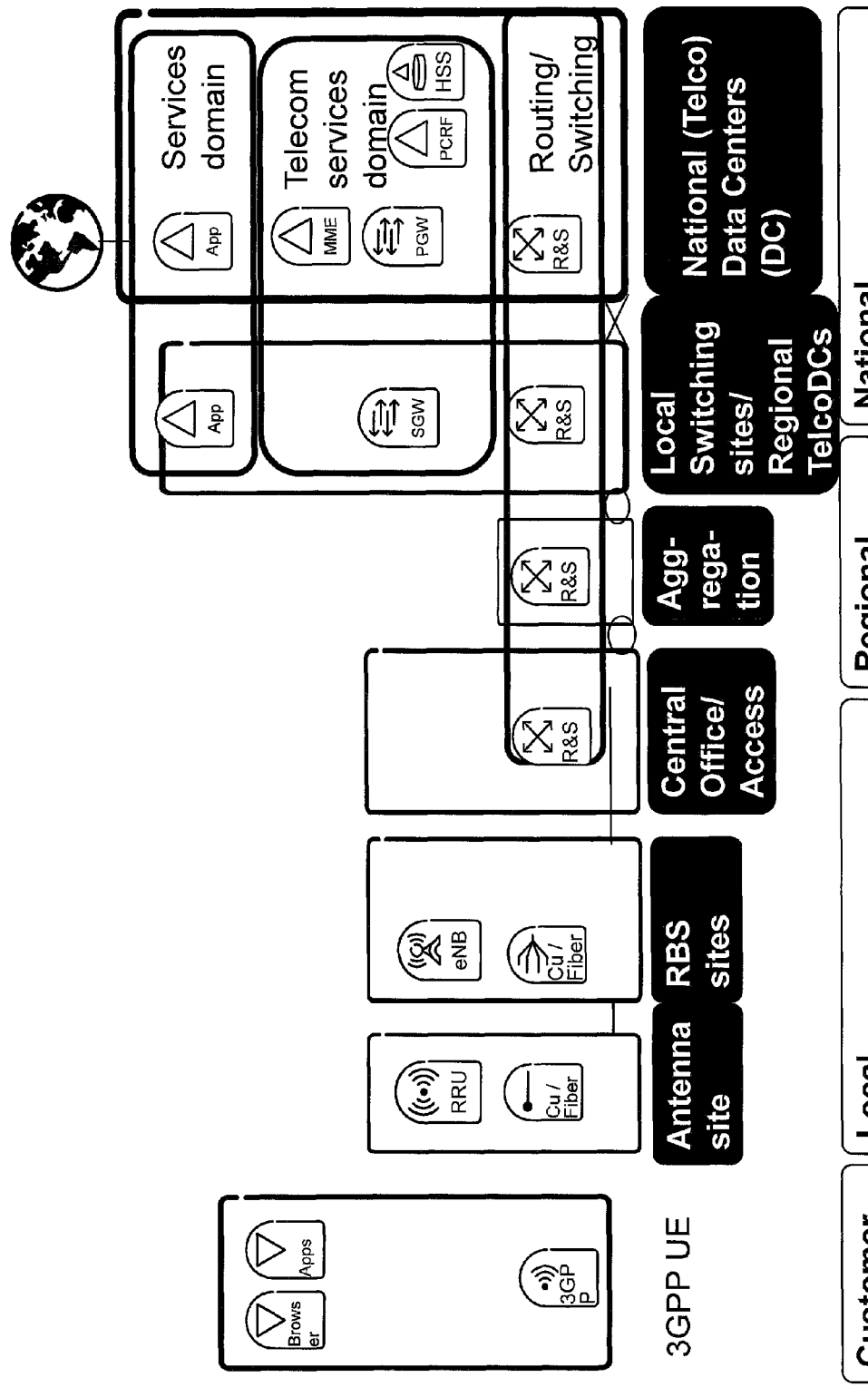
FIG. 1b is a schematic illustration of another deployment view of a communication network.
Figure 2A:
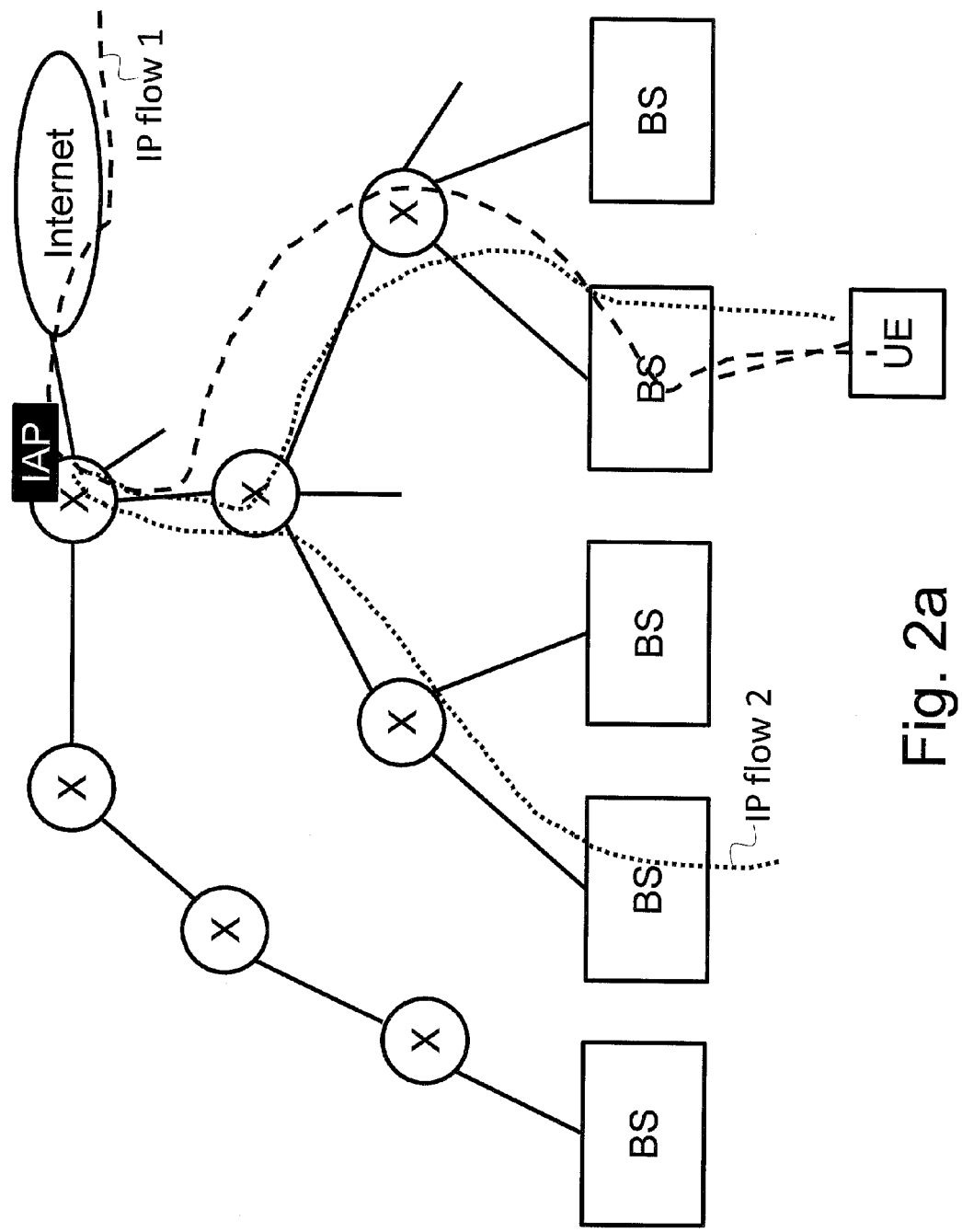
FIGS. 2a-f are schematic illustrations of routing of flows for different IAP placements in different scenarios.
Figure 2B:
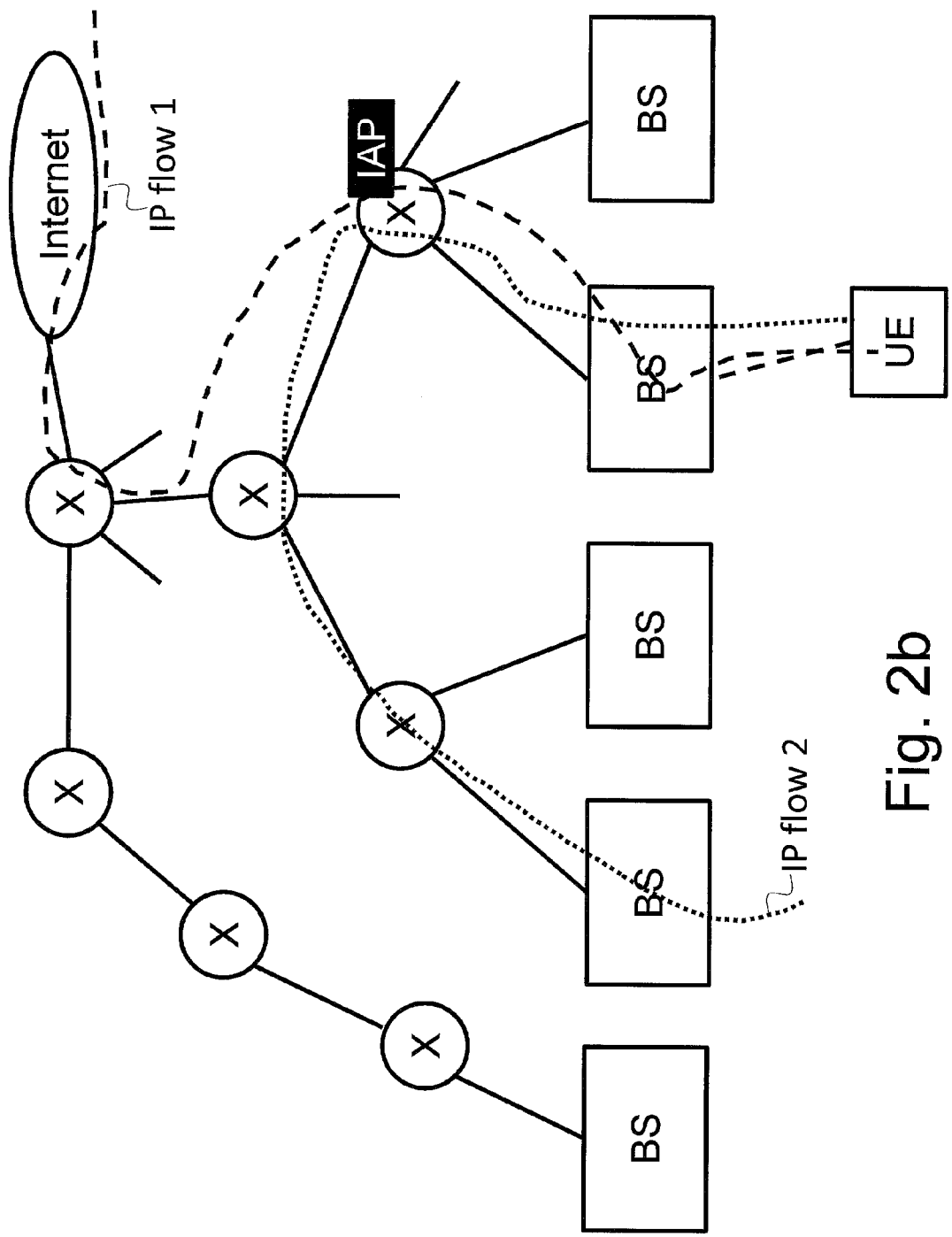
Figure 2C:
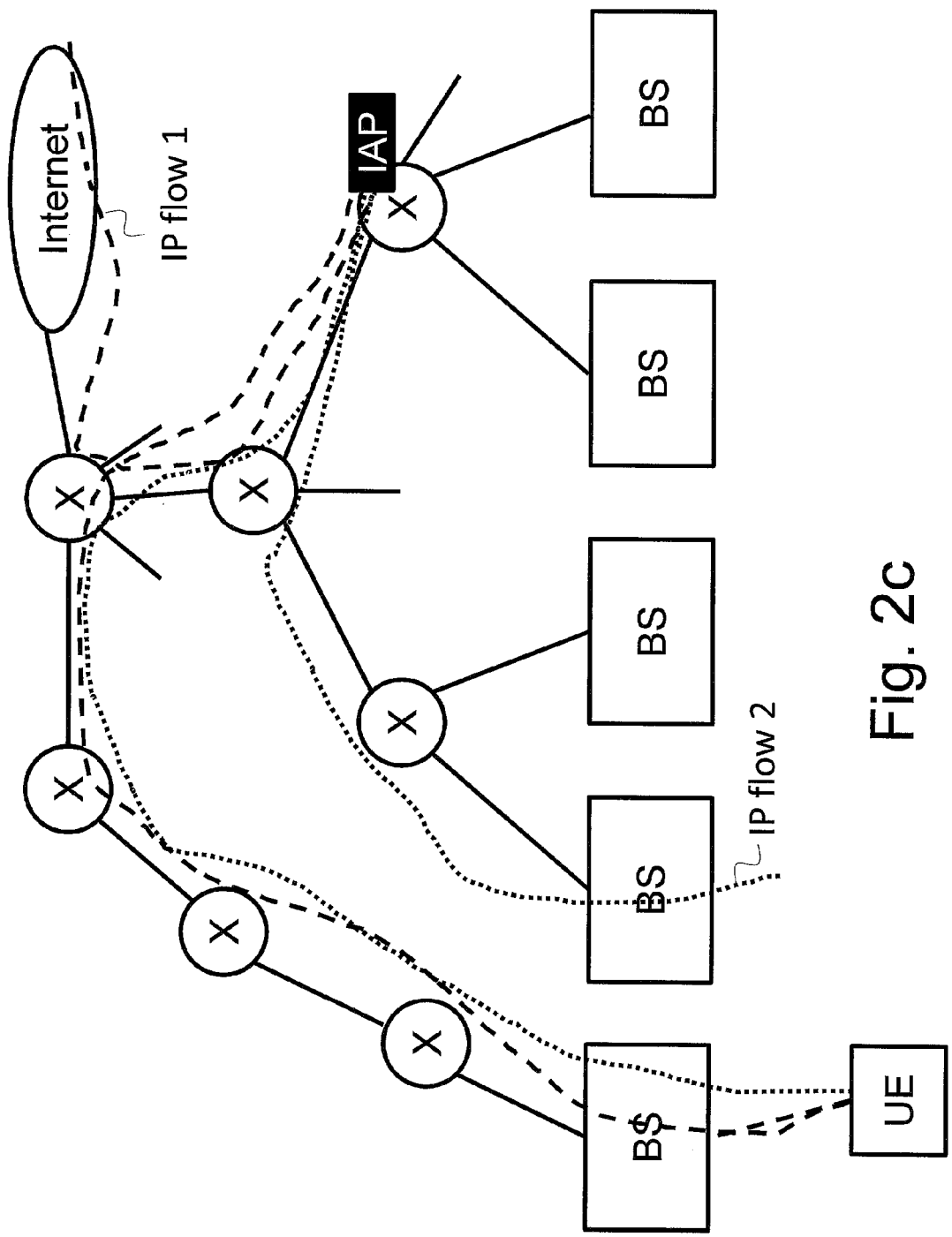
Figure 2D:
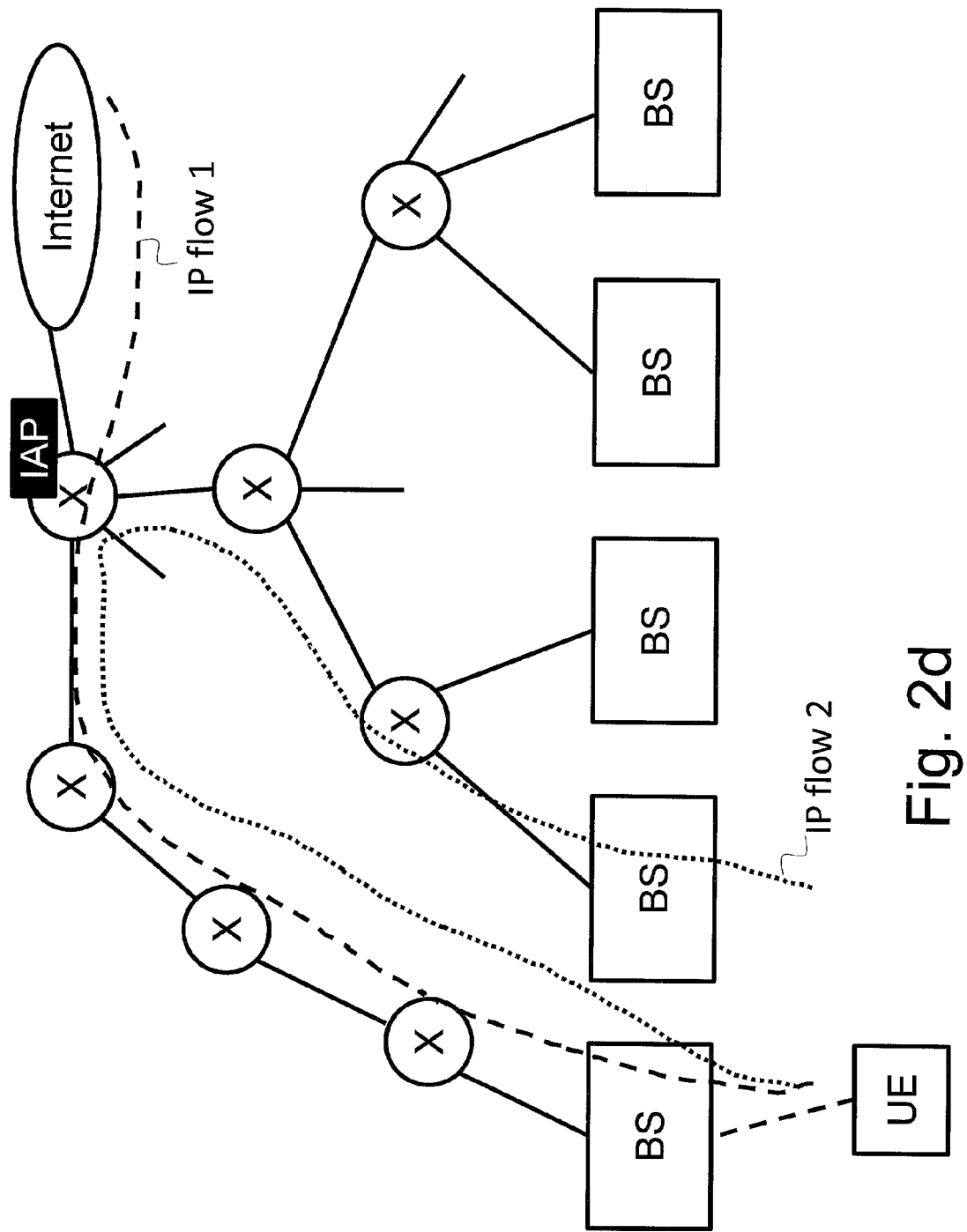
Figure 2E:
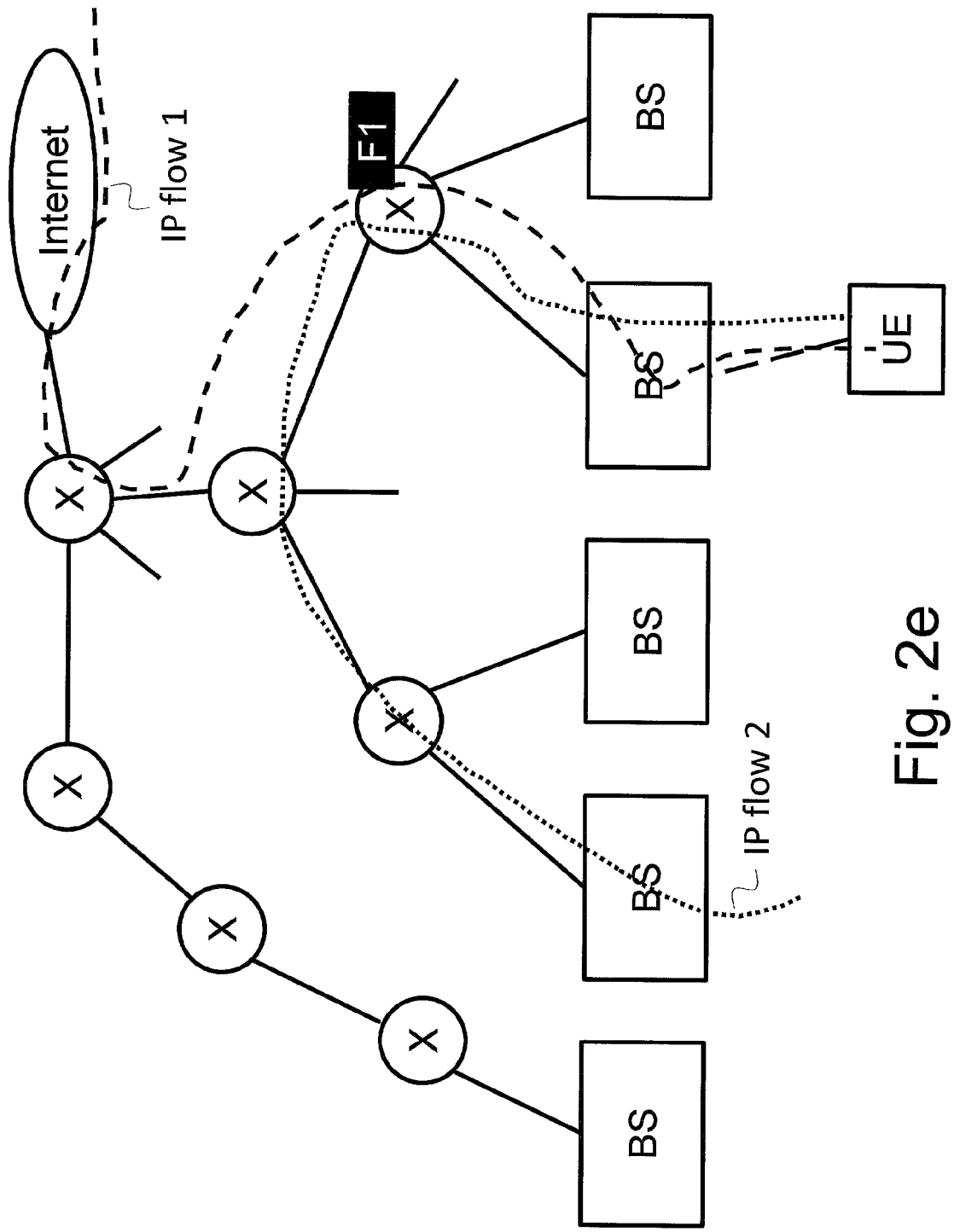

The above described methods of relocating user plane packet processing functions due to e.g. UE mobility or other considerations such as a load situation, makes it possible to support optimized routing also for moving devices, since user plane functions such as a policy enforcement function, or packet filtering must not stay in a fixed position, but can be moved when the UE is moving in the network. This is further illustrated in FIGS. 2e-f, where the packet processing function F1 is located in one instance in FIG. 2e, and is relocated to another instance in FIG. 2f thus allowing an optimal routing of the flow.

As explained above, there may be several packet processing functions which are performed at or below the IAP of a device, where the IP address of the device is advertised to a network. The following is a list of some example functions for processing data packets of a flow associated with one or more devices:

Firewalls;
Network Address Translation (NAT) functions;
Content Enrichment;
Proxies;
Application-Layer Gateways (ALG) and other application specific processing middle-boxes
Packet Inspection;
Data Mining;
Packet Classification for Quality of Service differentiation;
Policy enforcement/shaping;
Charging/counters;
Mobility anchor, bearer binding and verification;
Encryption and Header Compression.

Many of these packet processing functions are controlled by a control entity or instance responsible for configuring and managing the packet processing function and controlling how the function processes the data packets of the flow. Examples of such control instances which are standardized in 3GPP are the PCRF and the MME. In addition to standardized entities, there could also be other non-standardized control instances and Operation and Maintenance (O&M) systems which also communicate with the packet processing functions. Similarly, there could be data collectors which receive usage data statistics from the packet processing functions.

Figure 2F:
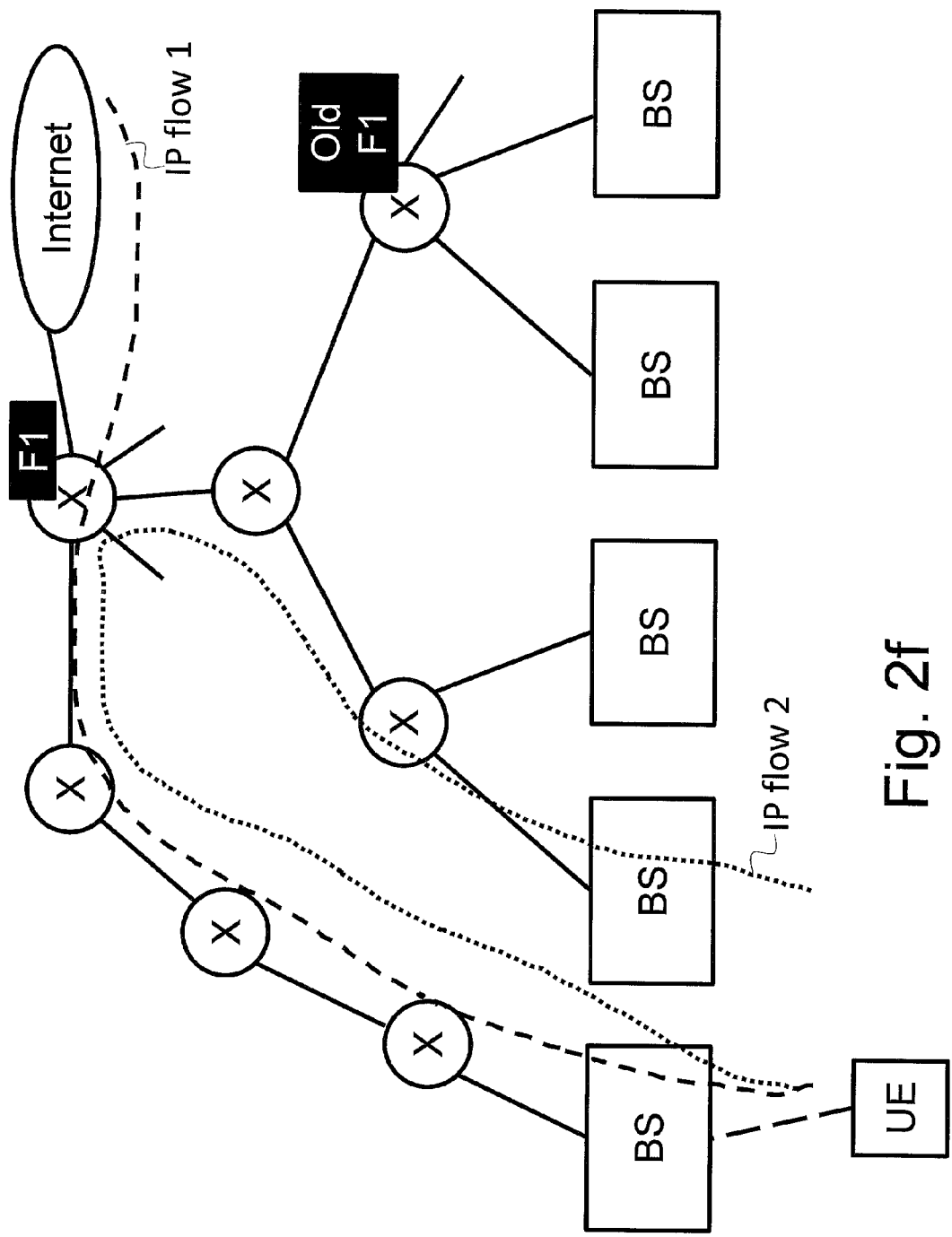

One problem that occurs when relocation of functions for processing data packets of a flow is enabled is that there are no generic solutions defined for how the control interfaces to the packet processing functions should be handled when the packet processing functions are relocated, e.g. in the example scenario illustrated in FIG. 2f.

One solution may be to specify a unique control interface relocation mechanism for each packet processing function. An example of this can be found in 3GPP TS 23.402 section 5.7.1, which defines the Proxy Mobile IP (PMIP)-based S5/S8 architecture. Upon SGW relocation, the Bearer Binding and Event Report Function in the SGW updates the control interface towards the PCRF. The drawback of such a solution is that every controller and packet processing function need to include functionality to relocate the control plane. There are also issues when a UE or wireless device moves across logical domain boundaries, where for instance there might not be any support for direct communication between a control instance located in one domain and a packet processing function instance in the other. Although it is probably possible to solve these types of problems, solutions would be needed for every packet processing function which would further complicate the solution.

According to embodiments of the present invention, the problem of having to specify a unique control interface relocation mechanism for each packet processing function to enable relocation of the packet processing functions is avoided by allocating a control plane proxy forwarding control messages or packets between a packet processing function and its control instance. Upon relocation of the packet processing function from a source instance to a target instance, the proxy starts forwarding any control messages or packets received from the controller to the target instance of the packet processing function and vice versa.

Embodiment A: Stand-Alone Node Acting as Proxy

In one embodiment, the proxy functionality is provided by a standalone node or a function specifically deployed to proxy the interface between a packet processing function and its control instance. This standalone node or function keeps track of the location or instance of the packet processing function over one or more relocations.

An arrangement such as a stand-alone node may be allocated as the proxy for a packet processing function, e.g. when the packet processing function is initially established in an initial instance. The initial instance of the packet processing function routes control messages to the control instance of the packet processing function via the proxy. Similarly, the control instance routes control messages via the proxy to the initial instance of the packet processing function. At relocation of the packet processing function, the proxy arrangement is informed of the new location or target instance of the packet processing function. After relocation, the target instance routes messages to the control instance via the proxy just as the initial instance of the packet processing function did. Relocations are thus made invisible to the control instance.

Figure 6:
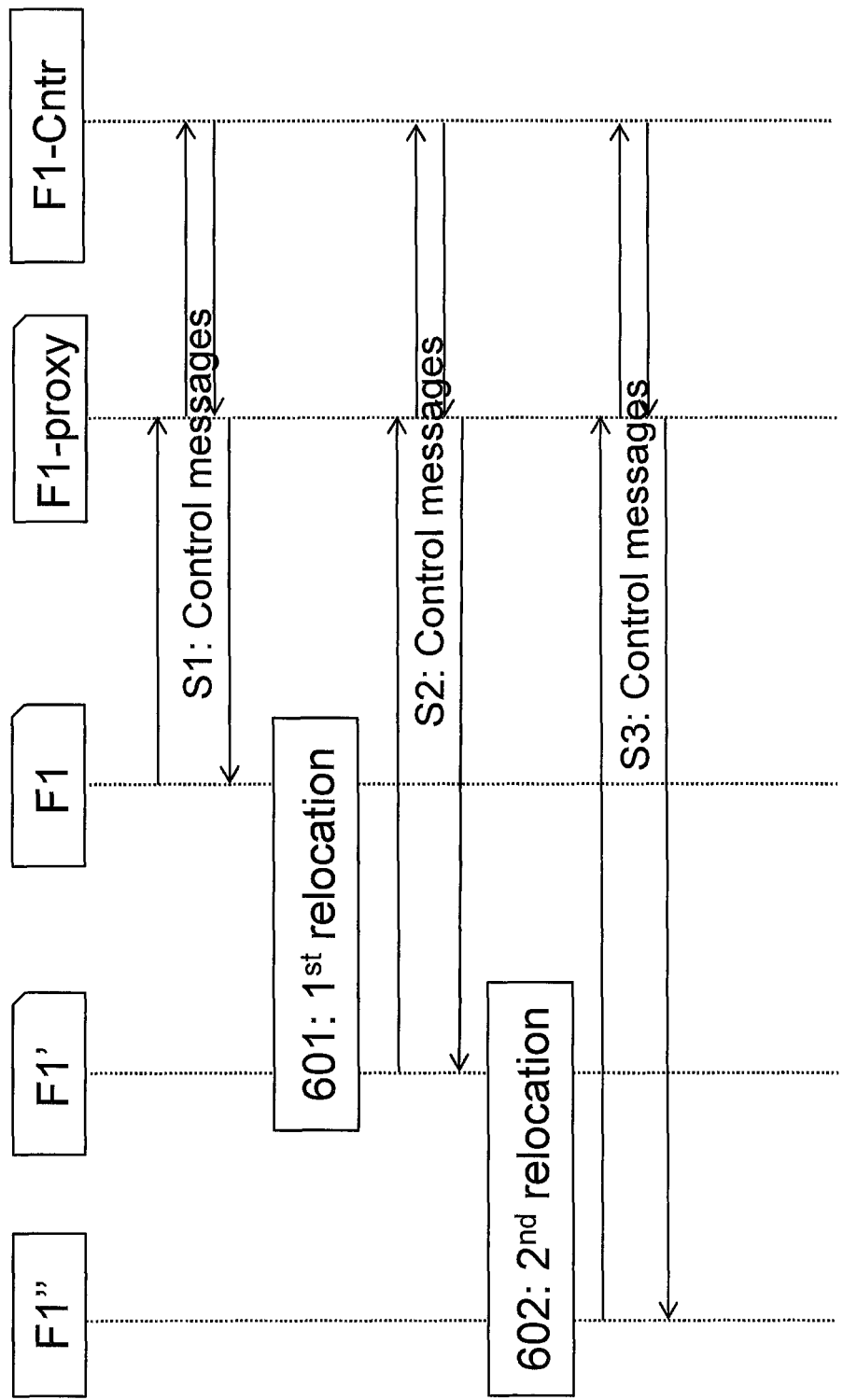
FIG. 6 is a signaling diagram illustrating the signaling of control messages via the proxy before and after relocations.

The signaling of control messages is schematically illustrated in FIG. 6. The initial, second and third instances of the packet processing function are denoted F1, F1' and F1" respectively, the control instance is denoted F1-Cntr, and the arrangement allocated as the proxy is denoted F1-proxy. Before the first relocation 601, the signaling of control messages in S1 is done between the control instance F1-Cntr and the initial instance F1 via the arrangement allocated as the proxy, F1-proxy. After the first relocation 601 of the packet processing function from the initial instance F1 to the second instance F1', the signaling of control messages in S2 is performed between the control instance F1-Cntr and the second instance F1' but still via the arrangement allocated as the proxy, F1-proxy. Correspondingly, after the second relocation 602 of the packet processing function from the second instance F1' to the third instance F1", the signaling of control messages in S3 is performed between the control instance F1-Cntr and the third instance F1" but still via the arrangement allocated as the proxy, F1-proxy. The control instance F1-Cntr is thus kept unaware of the relocation of the function.

The proxy may in embodiments be co-located with an eMME controlling the relocation of the packet processing function, or with a packet processing function instance. Furthermore, there are alternative embodiments for how and when the proxy is initially allocated and how it is informed of a relocation. The eMME may perform these tasks, or the packet processing function itself may do this.

If the eMME has the responsibility for controlling assignment, informing and updating, then the eMME allocates a proxy, and informs it of the current packet processing function instance. This means that the eMME provides the proxy with contact information, e.g. an IP address, a Fully qualified domain name (FQDN) or a Uniform Resource Locator (URL) of the packet processing function. Furthermore, the eMME informs the current instance of the packet processing function about the proxy, i.e. provides the current instance of the packet processing function with contact information, e.g. an IP address, a Fully qualified domain name (FQDN) or a Uniform Resource Locator (URL) of the proxy. During relocation the eMME informs the target packet processing function of the proxy, i.e. provides contact information for the proxy, and informs the proxy of the new target instance of the packet processing function, i.e. provides contact information for the target instance of the packet processing function.

If an instance of the packet processing function is in control of the assignment and updating of the proxy, then the initial instance of the packet processing function allocates a proxy and provides the proxy with its own contact information, i.e. contact information for the initial instance of the packet processing function. Optionally, the initial instance of the packet processing function informs the eMME of the allocated proxy. At relocation, the initial instance of the packet processing function transfers the contact information of the proxy to the target instance of the packet processing function. Either the initial or the target instance of the packet processing function updates the proxy with the contact information for the target instance of the packet processing function.

Hybrids of these two embodiments are also conceivable, e.g. that the eMME is responsible for the allocation of the proxy, but instances of the packet processing function handle the updating of the proxy in conjunction with relocation.

In case the proxy is co-located with the eMME or the packet processing function instance, then some of the interactions or messages described above may become node, entity, or instance internal messages.

The same entity or arrangement may act as proxy for one of more types of packet processing functions, at different times, for different flows, or simultaneously for the same flow(s).

An advantage of the described embodiments is that the proxy is updated whenever the packet processing function is relocated, while the interface towards the control instance controlling how the function processes the data packets of the flow will remain fixed, making the control instance unaware of the relocation.

The proxy can operate on different levels depending on what is most suitable for the control interface between the packet processing function and the control instance. Some examples of different levels that the proxy can operate on are:
- Transparent forwarding of all control message signaling between the packet processing function and the control instance.
- Termination of lower layers such as PHY/MAC/IP/TCP, Diameter, Radius, SCTP, SS7 of the control interface between the packet processing function and the control instance, but with transparent relaying of control messages.
- Decoding and forwarding of control messages. This may be required if the same control connection is used for many devices and/or certain messages need to be filtered.
- Decoding and modification of control messages, and independent operation of both links.

Embodiment B: eMME Acting as Proxy

In this embodiment, a mobility controller herein referred to as an eMME which controls the relocation of packet processing functions, acts as a control plane proxy for the control instances of the packet processing functions, thus hiding the relocation of the packet processing functions with regards to the control instances. One advantage of this embodiment is that the eMME is aware of the UE or device location as well as of the location or instance of the packet processing function processing data packets of a flow associated with the device.

Figure 7:
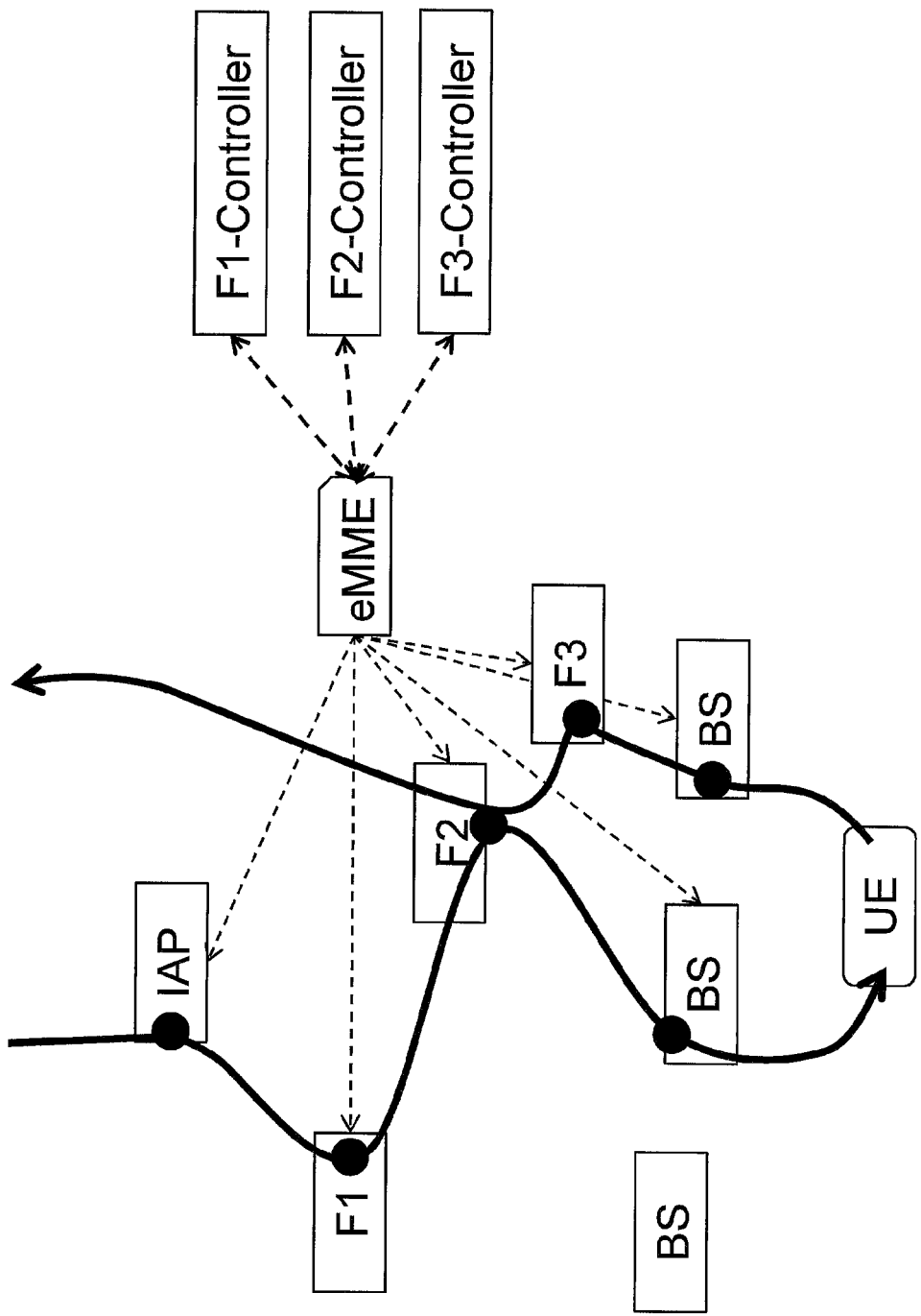
FIG. 7 is a schematic illustration where an eMME is acting as a control plane proxy.

FIG. 7 schematically illustrates the eMME acting as the control plane proxy. The packet processing functions F1, F2 and F3, and their respective control instances F1-Controller, F2-Controller and F3-Controller are illustrated in the FIG. 7, as well as the UE/device and the flow illustrated by the arrow passing through the functions F1 and F2 in the downlink and through F2 and F3 in the uplink. Any control messages received from the instances of the packet processing functions or from the control instances will be forwarded to the correct control instances and instances of packet processing functions respectively via the eMME acting as the proxy.

At mobility of the UE, the eMME may perform a relocation of one or more of the packet processing functions as described above, and may then start forwarding control plane messages from the control instance(s) to the new target instance(s) of the packet processing function(s) handling processing of data packets in the flow associated with the UE.

The eMME may implement just simple forwarding mechanisms of the control message. But it could also perform part of the control plane processing as described in the previous section. In one example embodiment, the interface towards the control instance could be a "heavy" or complex protocol like Diameter. Instead of terminating such protocol in the packet processing function, the eMME may terminate that protocol. The control interface between the packet processing function and eMME could then just consist of a light-weight protocol, such that control plane processing on the instance of the packet processing function is minimized.

Embodiment C: Instance of Packet Processing Function Acting as Proxy

In this embodiment the proxy functionality is provided in the instance of the packet processing function, i.e. the instance of the packet processing function acts as the proxy. This means that the control instance of the packet processing function only communicates with one instance of the packet processing function for a given device.

The interface between the control instance and the packet processing function is terminated in the initial instance of the packet processing function that the device/UE was assigned for this flow or connection/session. The connection may e.g. correspond to a packet data protocol (PDP) connection in the current EPS. From the control instance point of view it looks like the UE remains in the same instance of the function during the lifetime of the flow or connection. The instance of the packet processing function first serving this flow or connection is responsible for forwarding control messages between a target instance of the packet processing function and the control instance in case the UE context has been relocated to a target instance. For initial allocation of new connections or flows, the packet processing function serving the UE will terminate the interface towards the control instance of the function, i.e. no message forwarding is needed.

Figure 8A:
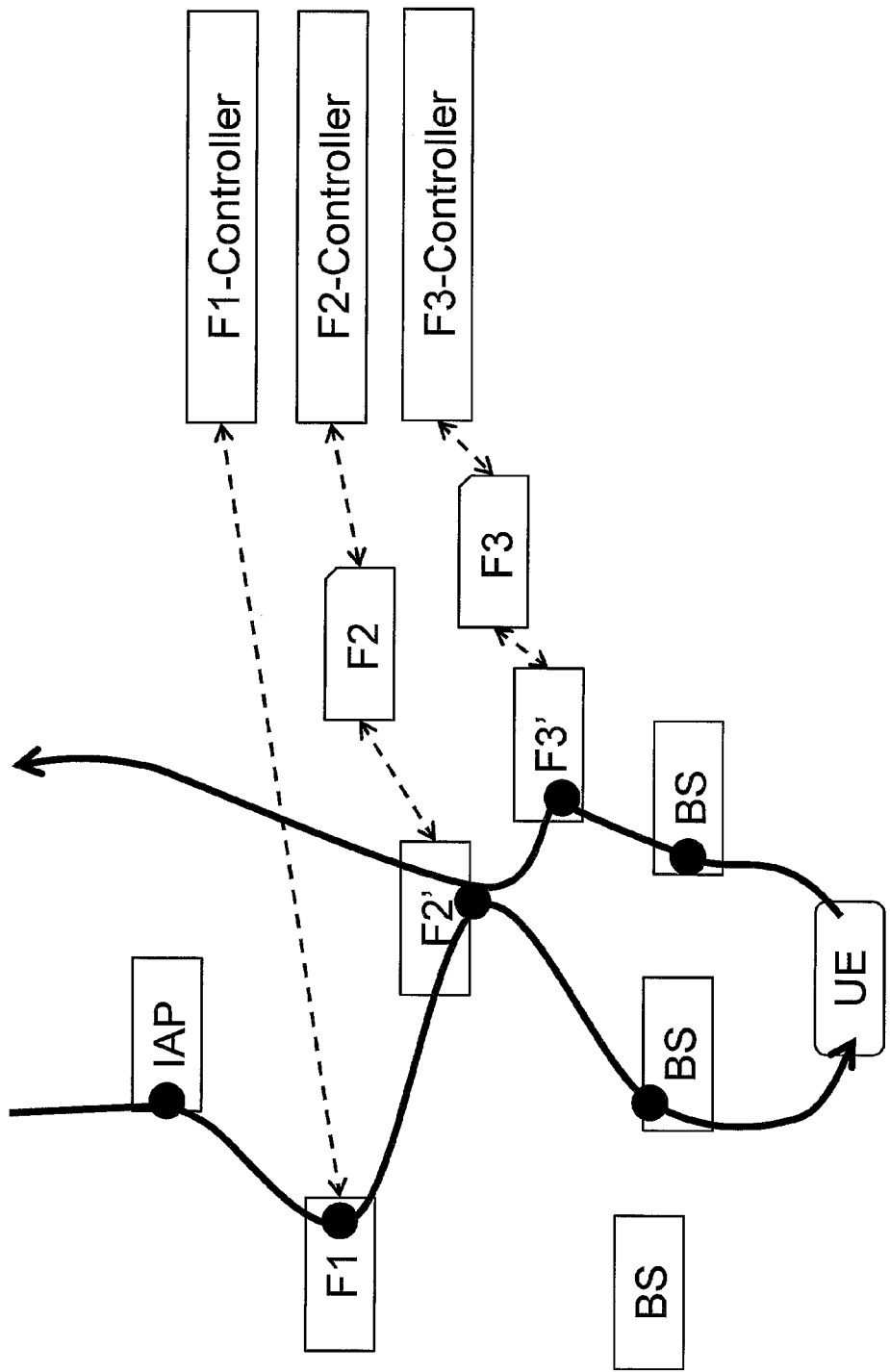
FIG. 8a is a schematic illustration where a source instance of a function is acting as a control plane proxy after relocation of the function to a target instance.

FIG. 8a illustrates the concept. In this case function F2 and F3 have been relocated during the ongoing connection. Function F2 is currently served in instance F2' and function F3 is currently served in instance F3'. The old function instances F2 and F3 still act as proxy for the F2 and F3-controller, thus hiding the relocation from these control instances. Function F1 has not been relocated.

One issue in this embodiment is how the instance of the packet processing function acting as the proxy knows where the UE and the current instance of the packet processing function serving it are located. Two different embodiments are described hereinafter. The two embodiments may be mixed. As one example, a number of relocations may be performed according to the second embodiment, and then a succeeding number of relocations may be performed according to the first embodiment. The eMME may control when to use which embodiment for the relocations.

First Embodiment: Use of Mobility Database

In a first embodiment the UE position is stored in a mobility database, e.g. a distributed database, which the instance of the packet processing function acting as the proxy can query when to find the instance of the packet processing function used for processing data packets of the flow associated with the UE. The data base will be updated at UE mobility and at packet processing function relocations.

The mobility database keeps track of the location of the UE context in different instances of the packet processing function. Every time a UE context is allocated to an instance of the packet processing function the database is updated. The updating can be performed by the packet processing function itself or by a control plane function such as eMME.

As an option, the database may be integrated in the eMME, which may be advantageous since the eMME knows the location of the UE and its instances of the packet processing function. At a minimum the following database entries will be created:

UE or subscriber context identifier, e.g. IP address or APN
Name/Identity of packet processing function
Location of packet processing function instance, e.g. IP address or port number This database can then be queried by packet processing functions based on the UE context identifier and the name/identity of the packet processing function to get information about location of the instance of the packet processing function currently used for processing data packets of the flow associated with the UE.

Figure 8B:
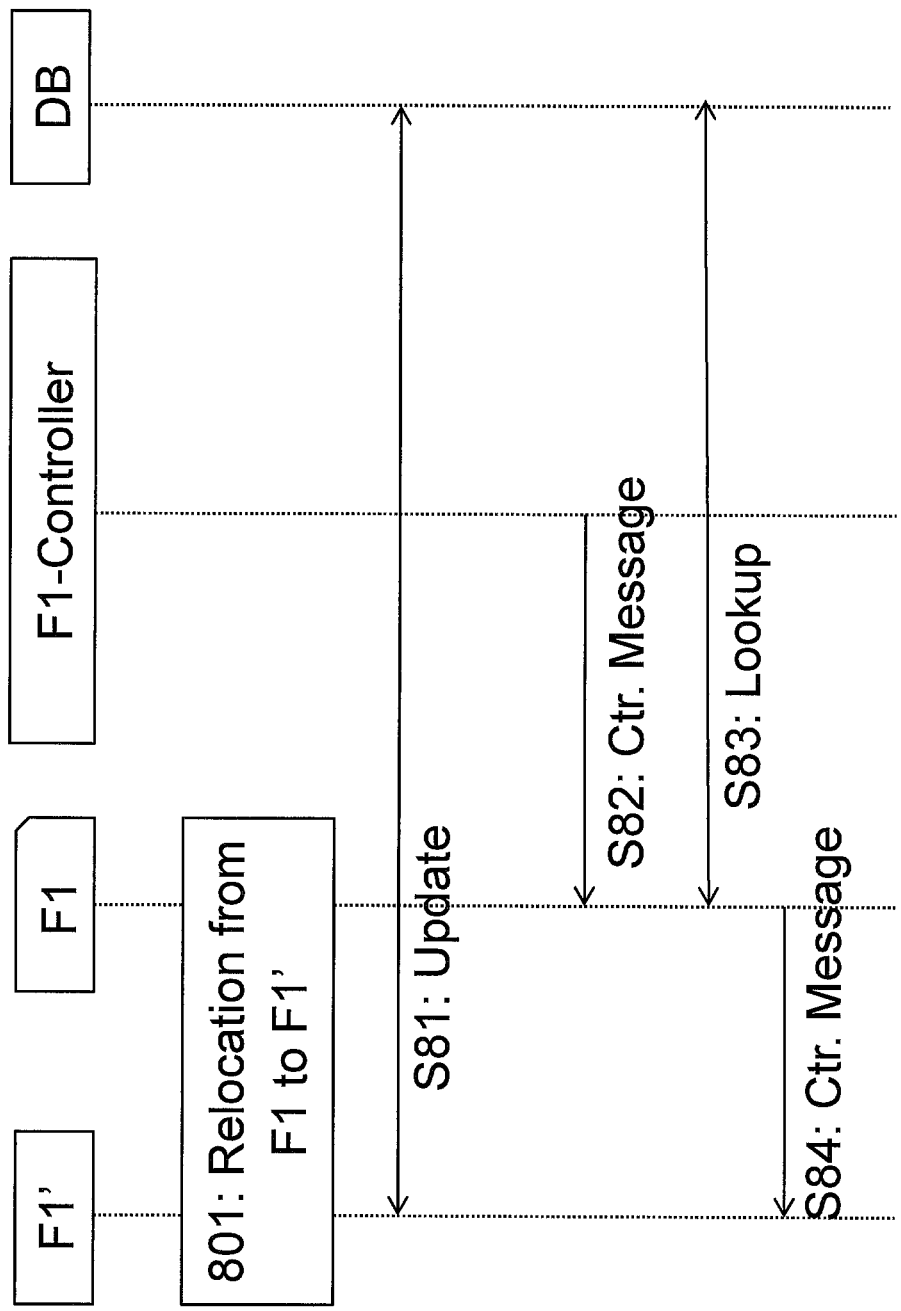

The procedure is illustrated in the signaling diagram of FIG. 8b where the option of letting the packet processing function itself update the database is used. In 801 a relocation of the packet processing function from instance F1 to instance F1' is performed. This triggers an update of the database (DB) in S81. In S82 the initial instance F1 receives a control message from the control instance of the packet processing function F1-Controller. In S83 the initial instance F1 makes a lookup in the database and retrieves the location of the current packet processing function instance F1'. In S84 the control message received in S82 is forwarded to the current instance of the packet processing function F1'.

In the other direction, the current instance of the function F1' sends the control messages to the control instance F1-Controller via the initial instance F1 acting as the proxy. Upon a second relocation to a target instance of the function, the target instance keeps addressing the control instance F1-Controller via the initial instance F1. During the relocation from the intermediate instance F1', F1' transfers the address or other contact information of the initial instance F1 to the target instance as a part of the transferred context.

Second Embodiment: Cascading of Proxy

In a second embodiment the first instance of the packet processing function only know about the next second instance of the packet processing function. This knowledge is provided to the first instance of the function at relocation. The first instance of the function will just forward the control messages towards that second instance of the function. If the UE has moved further away and the packet processing function has been relocated again to a third instance, the second instance will forward the message further. In this way the instances acting as proxy will be cascaded.

The first instance of the packet processing function gets information about which second instance the UE context has been relocated to. Any control signaling messages from the control instance of the function is forwarded to the second instance. The procedure is illustrated in the signaling diagram of FIG. 8c, where the packet processing function is relocated first from instance F1 to instance F1' in 811, and then from instance F1' to instance F1" in 812. Once a control message from the control instance F1-controller arrives in F1, S85, it will forward, in accordance with its proxy function, the control message to instance F1', in S86, which will forward it to the instance F1" in S87. That is, each instance of the packet processing function only has to be aware of maximum two addresses for transfer of control messages. The packet processing function F1, acting as the proxy, has to know the address of the control instance and of the second instance F1' of the packet processing function. The last instance F1" of the packet processing function currently serving the UE has to know the address of the preceding instance F1' of the packet processing function. The instance F1' of the packet processing function in the middle of the cascaded instances has to be aware of the address to the next "upstream" instance F1 and "downstream" instance F1" of the packet processing function.

In the other direction, a similar routing is used, i.e. the instance F1" sends to instance F1', which sends to instance F1, which in turn sends to the control instance F1-Controller.

Methods According to Embodiments

Figure 9:
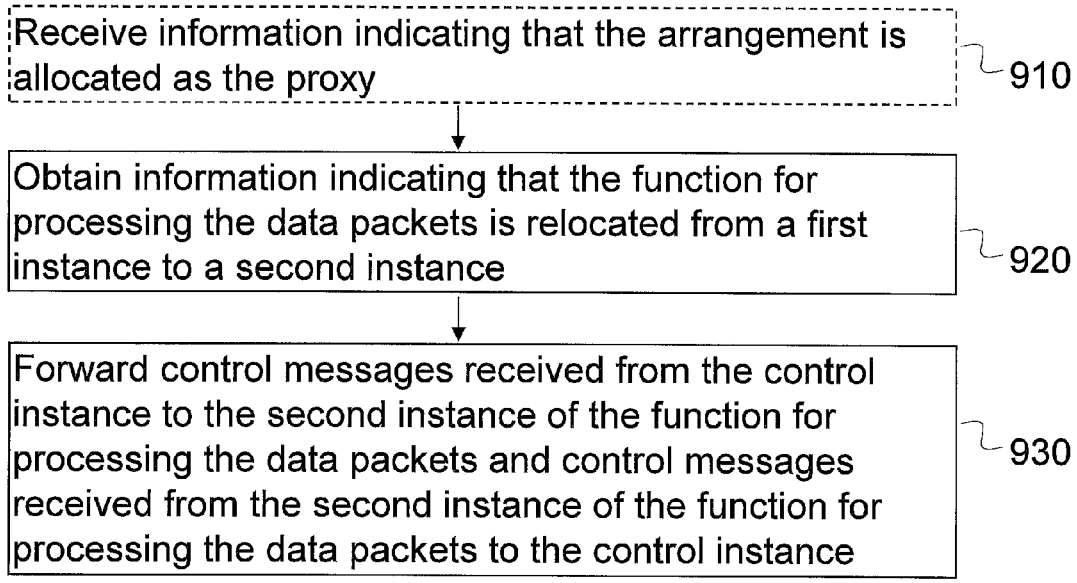
FIG. 9 is a flowchart illustrating the method in an arrangement allocated as a proxy according to some embodiments of the present invention.

FIG. 9 is a flowchart illustrating embodiments of a method for enabling relocation of a function for processing data packets of a flow associated with a device. The method is performed in an arrangement 300 of a communication system. The arrangement 300 is allocated as a proxy for control messages exchanged between an instance of the function for processing the data packets of the flow and a control instance 310 controlling how the function processes the data packets of the flow. The method comprises:

920: Obtaining information indicating that the function for processing the data packets is relocated from a first instance 360 to a second instance. The information indicating that the function for processing the data packets is relocated may be obtained from one of the following: an apparatus 350 controlling the relocation of the function for processing the data packets, the first instance 360 of the function, or the second instance 370 of the function.

930: In response to the obtained information, forwarding control messages received from the control instance 310 to the second instance 370 of the function for processing the data packets and control messages received from the second instance 370 of the function for processing the data packets to the control instance 310. As explained above, the arrangement (proxy) can operate on different levels depending on what is most suitable for the control interface between the packet processing function and the control instance. The forwarding of control messages may thus comprise one of the following: transparent forwarding of the control messages; termination of a lower level of an interface related to the control message and transparent relaying of the control messages; decoding and forwarding of the control messages; decoding and modification of the control messages before forwarding.

In embodiments, the arrangement may be a stand-alone node. Alternatively, the arrangement may be co-located with an apparatus controlling the relocation of the function for processing the data packets, such as the eMME. The arrangement may then be allocated as the proxy at establishment of the flow. In another alternative, the arrangement may be co-located with the first instance of the function, the arrangement then being allocated as the proxy when obtaining 920 the information indicating that the function for processing the data packets is relocated. The method may optionally comprise:

910: Receiving information indicating that the arrangement is allocated as the proxy. The information indicating that the arrangement is allocated as the proxy comprises information identifying the second instance. The information indicating that the arrangement is allocated as the proxy may be received from one of: an apparatus controlling the relocation of the function for processing the data packets; and the first instance of the function for processing the data packets. In embodiments of the invention, the arrangement may inherently know that it should act as a proxy and does thus not need to receive any information that it is allocated as the proxy from any other node. The arrangement may e.g. be either programmed or configured to act as a proxy. Therefore, this step of receiving the information is optional. This may for example be the case when the arrangement is co-located with the eMME. In other embodiments the arrangement may be assigned the proxy task by another node, such as the eMME, i.e. the apparatus controlling the relocation of the function. This may e.g. be done at relocation of the function for processing data packets from the first to the second instance, and the arrangement must at that time be informed of the identity of the second instance of the function.

Figure 10:
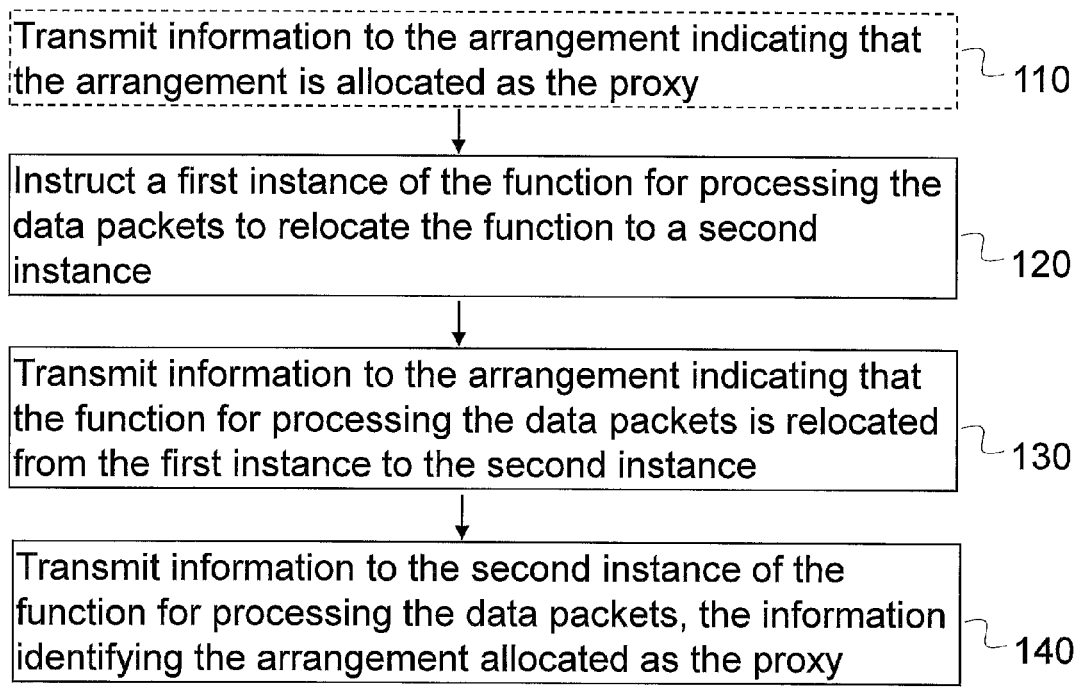
FIG. 10 is a flowchart illustrating the method in an apparatus controlling the relocation according to some embodiments of the present invention.

FIG. 10 is a flowchart illustrating embodiments of a method for enabling relocation of a function for processing data packets of a flow associated with a device. The device is configured to operate in a communication system. The method is performed in an apparatus 350 of the communication system. The apparatus 350 controls the relocation of the function for processing the data packets. The apparatus may correspond to the eMME. This embodiment may correspond to the scenario described above in section "Managing control plane connections when relocating user plane functions", where it is the eMME that has the responsibility for allocating and updating the proxy. The apparatus 350 is connected to the arrangement 300 allocated as the proxy for control messages exchanged between an instance of the function for processing the data packets and a control instance 310 controlling how the function processes the data packet. The method comprises:

120: Instructing a first instance 360 of the function for processing the data packets to relocate the function to a second instance 370. A general relocation method and some examples have been thoroughly described above.

130: Transmitting information to the arrangement 300 indicating that the function for processing the data packets is relocated from the first instance 360 to the second instance 370.

140: Transmitting information to the second instance 370 of the function for processing the data packets, the information identifying the arrangement 300 allocated as the proxy.

In embodiments, the method further optionally comprises:

110: Transmitting information to the arrangement 300 indicating that the arrangement 300 is allocated as the proxy. The method step may correspond to step 910 described above with reference to FIG. 9. The information may comprise information identifying the first instance 360 of the function, and may be transmitted at establishment of the flow associated with the device. Alternatively, the information may comprise information identifying the second instance 370 of the function, and may be transmitted when instructing 120 the first instance 360 of the function to relocate. The arrangement is thus allocated as the proxy at relocation.

Figure 11A:
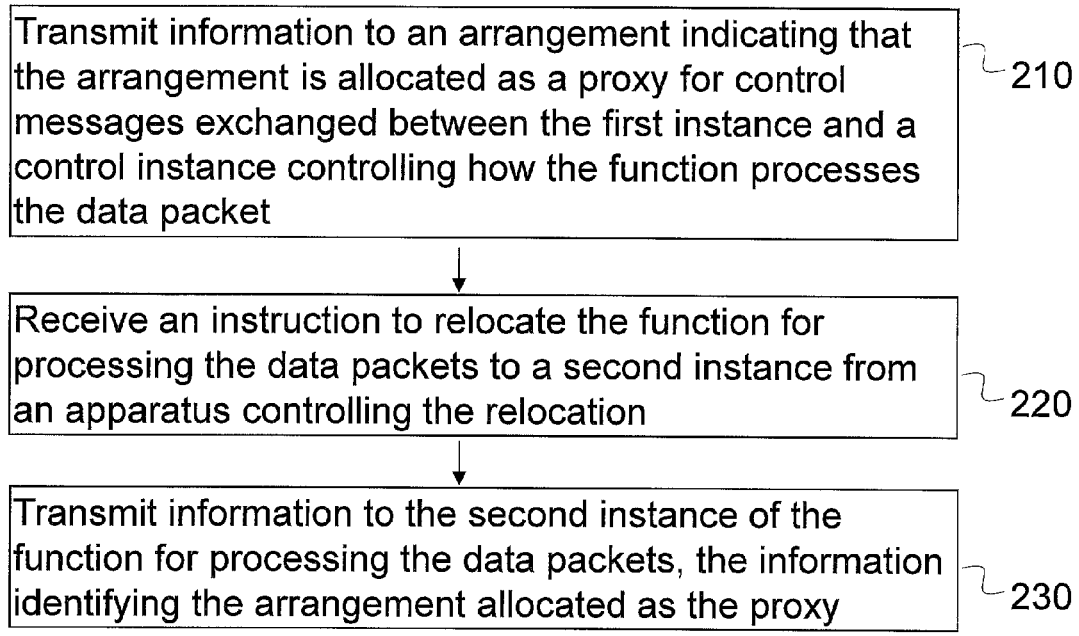
FIGS. 11a-b are flowcharts illustrating the method in an instance of the function for processing data packets according to some embodiments of the present invention.

FIG. 11a is a flowchart illustrating embodiments of a method for enabling relocation of a function for processing data packets of a flow associated with a device configured to operate in a communication system. The method is performed in the first instance 360 of the function for processing the data packets of the flow, This embodiment may correspond to the scenario described above in section "Managing control plane connections when relocating user plane functions", where it is the first instance of the function that has the responsibility for allocating and updating the proxy arrangement. The method comprises:

210: Transmitting information to an arrangement 300 indicating that the arrangement 300 is allocated as a proxy for control messages exchanged between the first instance 360 and a control instance 310 controlling how the function processes the data packet.

220: Receiving an instruction to relocate the function for processing the data packets to a second instance 370. The instruction is received from the apparatus 350 controlling the relocation.

230: Transmitting information to the second instance 370 of the function for processing the data packets, the information identifying the arrangement 300 allocated as the proxy.

Figure 11B:
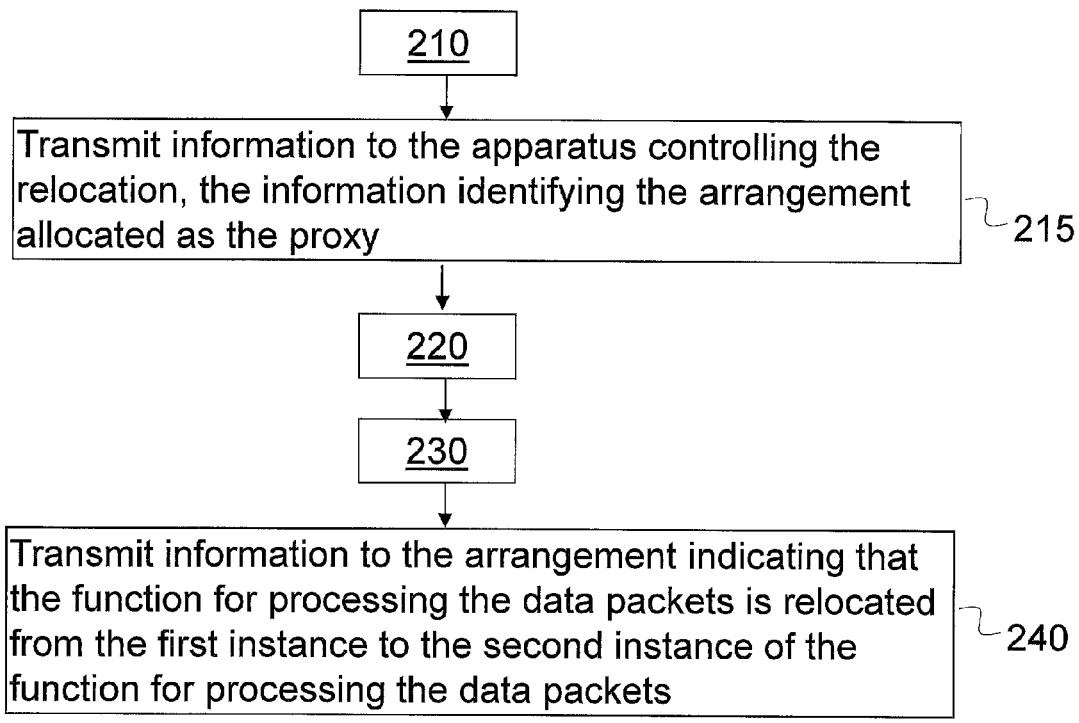

FIG. 11b is a flowchart illustrating another embodiment of the method performed in the first instance 360. The method may further comprise in addition to steps 210-230 described above:

215: Transmitting information to the apparatus 350 controlling the relocation, the information identifying the arrangement 300 allocated as the proxy.

240: Transmitting information to the arrangement 300 indicating that the function for processing the data packets is relocated from the first instance 360 to the second instance 370 of the function for processing the data packets.

In any of the embodiments described above with reference to FIGS. 9, 10, and 11a-b, the communication network may be a wireless communication network, and the device may be a wireless device.

Apparatus According to Embodiments

Figure 12A:
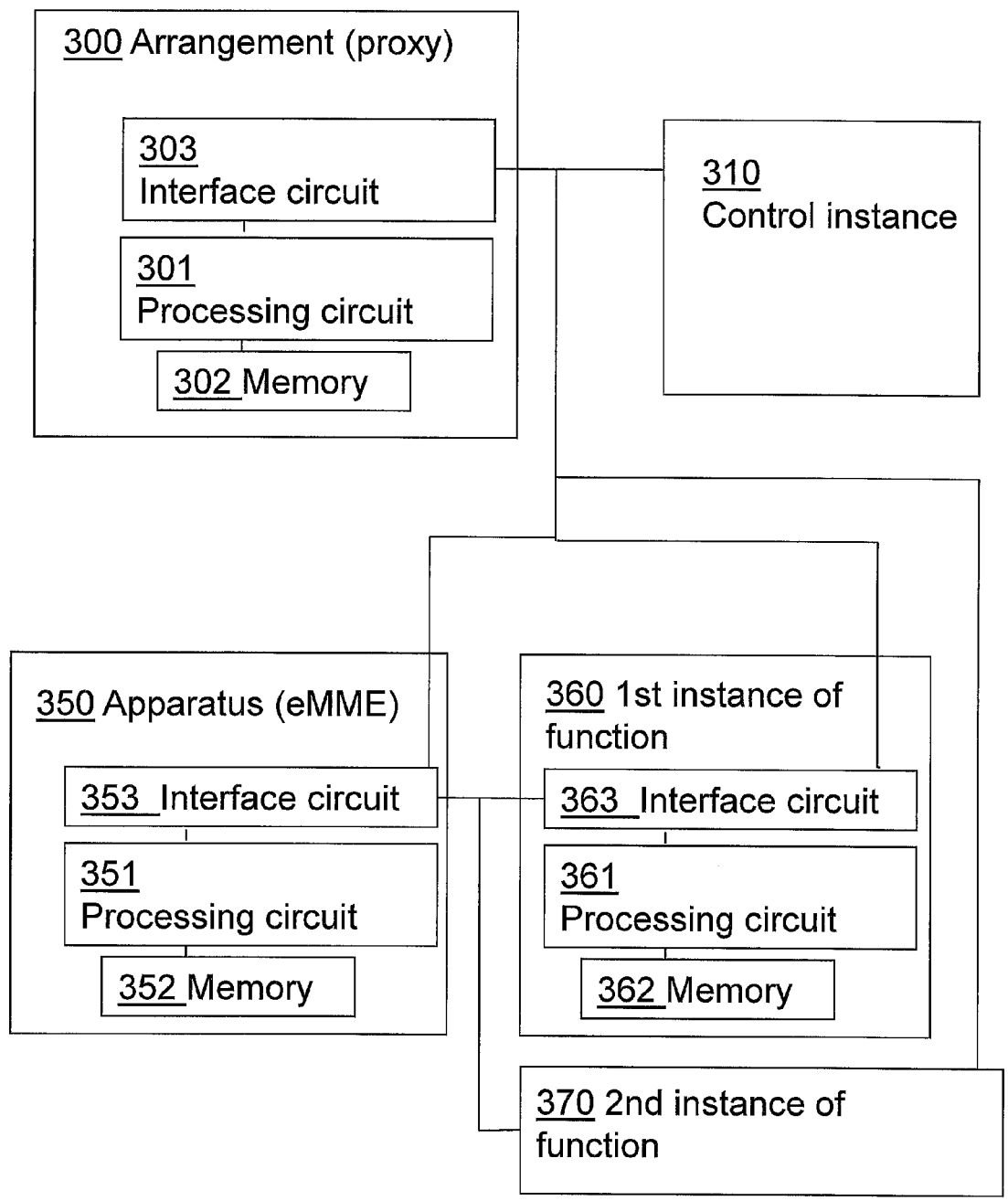
FIGS. 12a-b are block diagrams schematically illustrating the arrangement allocated as a proxy, the apparatus controlling the relocation, and the instance of the function for processing data packets, according to some embodiments of the present invention.

An embodiment of the arrangement 300 for a communication system is schematically illustrated in the block diagram in FIG. 12a. The arrangement 300 is configured to enable relocation of a function for processing data packets of a flow associated with a device. The arrangement 300 is also configured to be allocated as a proxy for control messages exchanged between the instance of the function for processing the data packets of the flow and the control instance 310 controlling how the function processes the data packets of the flow. The arrangement 300 is further configured to obtain information indicating that the function for processing the data packets is relocated from a first instance 360 to a second instance 370. The arrangement 300 may be further configured to obtain the information indicating that the function for processing the data packets is relocated from one of the following: an apparatus 350 controlling the relocation of the function for processing the data packets, the first instance 360 of the function, or the second instance 370 of the function. The arrangement 300 is also configured to, in response to the obtained information, forward control messages received from the control instance 310 to the second instance 370 of the function for processing the data packets and control messages received from the second instance 370 of the function for processing the data packets to the control instance 310.

Optionally, the arrangement 300 may be configured to receive information indicating that the arrangement 300 is allocated as the proxy. The information indicating that the arrangement 300 is allocated as the proxy may comprise information identifying the second instance 370. The arrangement 300 may be further configured to receive the information indicating that the arrangement 300 is allocated as the proxy from one of: an apparatus 350 controlling the relocation of the function for processing the data packets; and the first instance 360 of the function for processing the data packets.

The arrangement 300 may be configured to be co-located with an apparatus 350 controlling the relocation of the function for processing the data packets and to be allocated as the proxy at establishment of the flow. Alternatively, the arrangement 300 may be configured to be co-located with the first instance 360 of the function, and to be allocated as the proxy when obtaining the information indicating that the function for processing the data packets is relocated.

The arrangement 300 may be further configured to forward control messages by one of the following: transparent forwarding of the control messages; termination of a lower level of an interface related to the control message and transparent relaying of the control messages; decoding and forwarding of the control messages; decoding and modification of the control messages before forwarding.

In embodiments of the invention, the arrangement 300 may comprise a processing circuit 301 and a memory 302 as illustrated in FIG. 12a. The arrangement 300 may also comprise an interface circuit 303 configured to communicate with other instances and apparatus either directly or by controlling the communication via another node of the communication network. The memory 302 may contain instructions executable by said processing circuit 301 whereby the arrangement 300 is operative to obtain information indicating that the function for processing the data packets is relocated from a first instance 360 to a second instance 370. The arrangement 300 is further operative to, in response to the obtained information, forward control messages received from the control instance 310 to the second instance 370 of the function for processing the data packets and control messages received from the second instance 370 of the function for processing the data packets to the control instance 310.

Figure 12B:
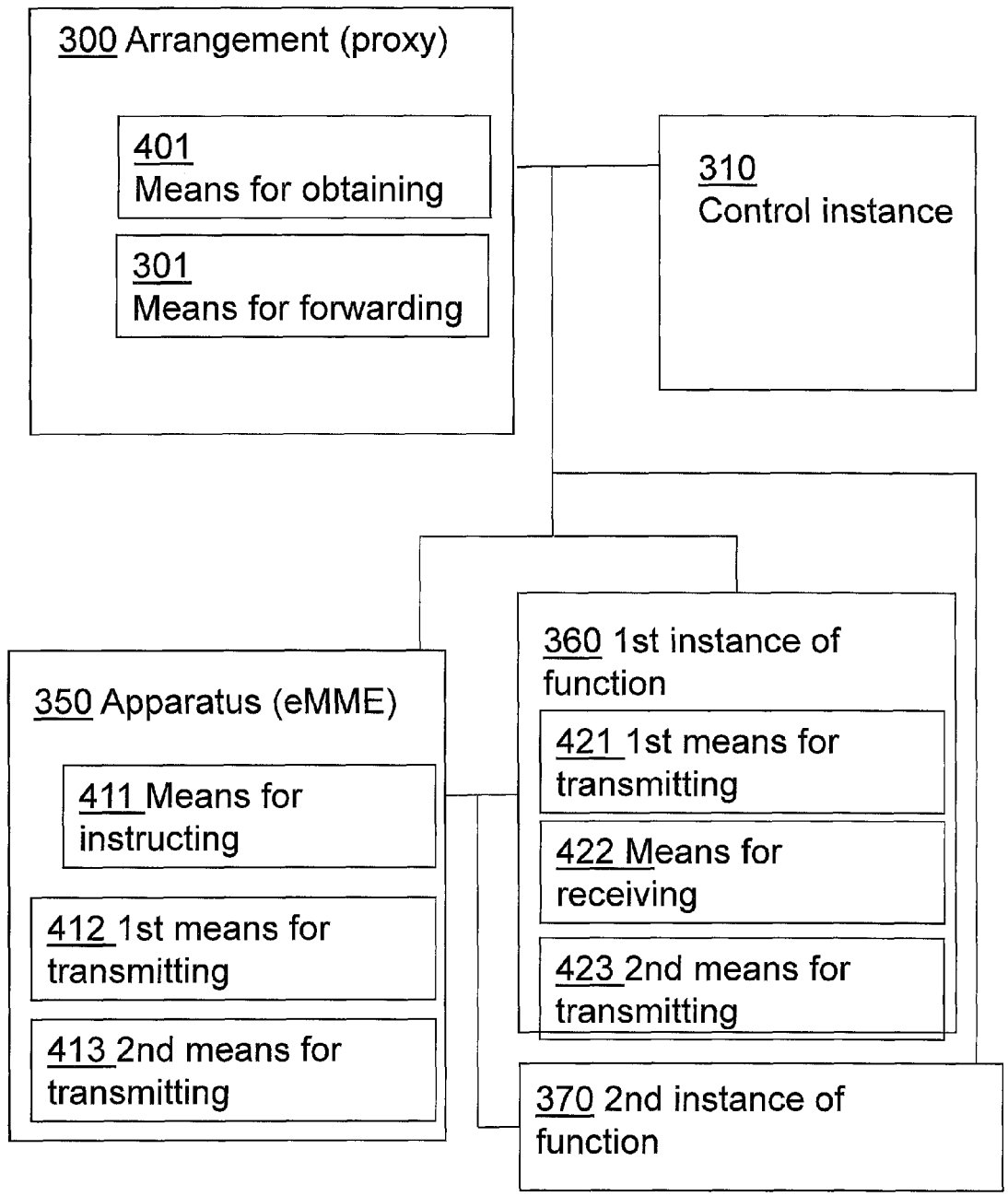

In an alternative way to describe the embodiment in FIG. 12a, illustrated in FIG. 12b, the arrangement 300 may comprise a means for obtaining 401 adapted to obtain information indicating that the function for processing the data packets is relocated from a first instance 360 to a second instance 370. The arrangement 300 may also comprise means for forwarding 402 adapted to in response to the obtained information, forward control messages received from the control instance 310 to the second instance 370 of the function for processing the data packets and control messages received from the second instance 370 of the function for processing the data packets to the control instance 310. The means described are functional units which may be implemented in hardware, software, firmware or any combination thereof. In one embodiment, the means are implemented as a computer program running on a processor.

An embodiment of the apparatus 350 for the communication system configured to enable relocation of a function for processing data packets of a flow associated with a device configured to operate in the communication system is also schematically illustrated in the block diagram in FIG. 12a. The apparatus 350 is configured to control the relocation of the function for processing the data packets. The apparatus 350 is connectable to the arrangement 300 allocated as a proxy for control messages exchanged between an instance of the function for processing the data packets and a control instance 310 controlling how the function processes the data packet. The apparatus 350 is further configured to instruct a first instance 360 of the function for processing the data packets to relocate the function to a second instance 370. The apparatus 350 is also configured to transmit information to the arrangement 300 indicating that the function for processing the data packets is relocated from the first instance 360 to the second instance 370. The apparatus 350 is further configured to transmit information to the second instance 370 of the function for processing the data packets, the information identifying the arrangement 300 allocated as the proxy.

In embodiments, the apparatus 350 may be further configured to transmit information to the arrangement 300 indicating that the arrangement 300 is allocated as the proxy. Furthermore, the apparatus 350 may be further configured to transmit the information to the arrangement 300 indicating that the arrangement 300 is allocated as the proxy at establishment of the flow associated with the device, wherein the information comprises information identifying the first instance 360 of the function. Alternatively, the apparatus 350 may be further configured to transmit the information to the arrangement 300 indicating that the arrangement 300 is allocated as the proxy when instructing the first instance 360 of the function to relocate, wherein the information comprises information identifying the second instance 370 of the function.

In embodiments of the invention, the apparatus 350 may comprise a processing circuit 351 and a memory 352 as illustrated in FIG. 12a. The apparatus 350 may also comprise an interface circuit 353 configured to communicate with other instances and apparatus either directly or indirectly. The memory 352 may contain instructions executable by said processing circuit 351 whereby the apparatus 350 is operative to instruct a first instance 360 of the function for processing the data packets to relocate the function to a second instance 370. The apparatus 350 is further operative to transmit information to the arrangement 300 indicating that the function for processing the data packets is relocated from the first instance 360 to the second instance 370. The apparatus 350 is also operative transmit information to the second instance 370 of the function for processing the data packets, the information identifying the arrangement 300 allocated as the proxy.

In an alternative way to describe the embodiment in FIG. 12a, illustrated in FIG. 12b, the apparatus 350 may comprise means for instructing 411 adapted to instruct a first instance 360 of the function for processing the data packets to relocate the function to a second instance 370. The apparatus 350 may also comprise first means for transmitting 412 adapted to transmit information to the arrangement 300 indicating that the function for processing the data packets is relocated from the first instance 360 to the second instance 370. The apparatus 350 may also comprise second means for transmitting 413 adapted to transmit information to the second instance 370 of the function for processing the data packets, the information identifying the arrangement 300 allocated as the proxy. The means described are functional units which may be implemented in hardware, software, firmware or any combination thereof. In one embodiment, the means are implemented as a computer program running on a processor.

An embodiment of the first instance 360 of a function for processing the data packets of a flow associated with a device configured to operate in a communication system, is also schematically illustrated in the block diagram in FIG. 12a. The first instance 360 is configured to enable relocation of the function for processing data packets of a flow. The first instance 360 is further configured to transmit information to an arrangement 300 indicating that the arrangement 300 is allocated as a proxy for control messages exchanged between the first instance 360 and a control instance 310 controlling how the function processes the data packet. The first instance 360 is also configured to receive an instruction to relocate the function for processing the data packets to a second instance 370, the instruction being received from the apparatus 350 controlling the relocation. The first instance 360 is further configured to transmit information to the second instance 370 of the function for processing the data packets, the information identifying the arrangement 300 allocated as the proxy.

The first instance 360 may be further configured to transmit information to the arrangement 300 indicating that the function for processing the data packets is relocated from the first instance 360 to the second instance 370 of the function for processing the data packets. The first instance 360 may be further configured to transmit information to the apparatus 350 controlling the relocation, the information identifying the arrangement 300 allocated as the proxy.

In embodiments of the invention, the first instance 360 may comprise a processing circuit 361 and a memory 362 as illustrated in FIG. 12a. The first instance 360 may also comprise an interface circuit 363 configured to communicate with other instances and apparatus either directly or by controlling the communication via another node of the communication network. The memory 362 may contain instructions executable by said processing circuit 361 whereby the first instance 360 is operative to transmit information to an arrangement 300 indicating that the arrangement 300 is allocated as a proxy for control messages exchanged between the first instance 360 and a control instance 310 controlling how the function processes the data packet. The first instance 360 is further operative to receive an instruction to relocate the function for processing the data packets to a second instance 370, the instruction being received from the apparatus 350 controlling the relocation. The first instance 360 is further operative to transmit information to the second instance 370 of the function for processing the data packets, the information identifying the arrangement 300 allocated as the proxy.

In an alternative way to describe the embodiment in FIG. 12a, illustrated in FIG. 12b, the first instance 360 may comprise first means for transmitting 421 adapted to transmit information to an arrangement 300 indicating that the arrangement 300 is allocated as a proxy for control messages exchanged between the first instance 360 and a control instance 310 controlling how the function processes the data packet. The first instance 360 may also comprise means for receiving 422 adapted to receive an instruction to relocate the function for processing the data packets to a second instance 370, the instruction being received from the apparatus 350 controlling the relocation. The first instance 360 may also comprise second means for transmitting 423 adapted to transmit information to the second instance 370 of the function for processing the data packets, the information identifying the arrangement 300 allocated as the proxy. The means described are functional units which may be implemented in hardware, software, firmware or any combination thereof. In one embodiment, the means are implemented as a computer program running on a processor.

In still another alternative way to describe the embodiment in FIG. 12a, the arrangement 300, the apparatus 350 and the first instance 360 may each comprise a Central Processing Unit (CPU) which may be a single unit or a plurality of units. Furthermore, the arrangement 300, the apparatus 350 and the first instance 360 may each comprise at least one computer program product (CPP) in the form of a non-volatile memory, e.g. an EEPROM (Electrically Erasable Programmable Read-Only Memory), a flash memory or a disk drive. The CPP may comprise a computer program, which comprises code means which when run on the CPU of the arrangement 300, the apparatus 350 and the first instance 360 respectively causes them to perform the methods described earlier in conjunction with FIGS. 9, 10 and 11a-b. In other words, when said code means are run on the CPU, they correspond to the processing circuits 301, 351, 361 in FIG. 12a.

The above mentioned and described embodiments are only given as examples and should not be limiting. Other solutions, uses, objectives, and functions within the scope of the accompanying patent claims may be possible.

The invention claimed is:

1. A method for enabling relocation of a function for processing data packets of a flow associated with a device, the method being performed in an arrangement of a communication system, wherein the arrangement is allocated as a proxy for control messages exchanged between the function and a control instance controlling how the function processes the data packets of the flow, the method comprising:
   storing first contact information for the function, said first contact information for identifying a first location of the function;
   obtaining information indicating that the function has been relocated from the first location to a second location, wherein the information comprises second contact information for the function, said second contact information for identifying the second location;
   storing the second contact information for the function;
   after storing the second contact information for the function, receiving a control message for the function that was transmitted by the control instance; and
   in response to receiving the control message, using the second contact information to forward the control message to the function, wherein
   the control message comprises information for controlling how the function processes the data packets of the flow.

2. The method according to claim 1, further comprising:
   receiving information indicating that the arrangement is allocated as the proxy.

3. The method according to claim 2, wherein the information indicating that the arrangement is allocated as the proxy comprises information identifying the second location.

4. The method according to claim 2, wherein the information indicating that the arrangement is allocated as the proxy is received from one of: an apparatus controlling the relocation of the function for processing the data packets, and the function for processing the data packets at the first location.

5. The method according to claim 1, wherein the information indicating that the function for processing the data packets is relocated is obtained from one of the following: an apparatus controlling the relocation of the function for processing the data packets, the function at the first location, or the function at the second location.

6. The method according to claim 1, wherein the arrangement is co-located with an apparatus controlling the relocation of the function for processing the data packets, the arrangement being allocated as the proxy at establishment of the flow.

7. The method according to claim 1, wherein the arrangement is co-located with the first location of the function, the arrangement being allocated as the proxy when obtaining the information indicating that the function for processing the data packets is relocated.

8. The method according to claim 1, wherein the forwarding of control messages comprises one of the following:
   transparent forwarding of the control messages,
   termination of a lower level of an interface related to the control message and transparent relaying of the control messages,
   decoding and forwarding of the control messages, and
   decoding and modification of the control messages before forwarding.

9. A method for enabling relocation of a function for processing data packets of a flow associated with a device configured to operate in a communication system, the method being performed in an apparatus of the communication system, the apparatus controlling the relocation of the function for processing the data packets, the apparatus being connected to an arrangement allocated as a proxy for control messages exchanged between an instance of the function for processing the data packets and a control instance controlling how the function processes the data packet, the method comprising:
   instructing a first instance of the function for processing the data packets to relocate the function to a second instance,
   transmitting information to the arrangement indicating that the function for processing the data packets is relocated from the first instance to the second instance, wherein the arrangement is configured to exchange control messages between the control instance and the second instance, and wherein the control messages comprise information indicating how the function processes the data packets of the flow, and
   transmitting information to the second instance of the function for processing the data packets, the information identifying the arrangement allocated as the proxy.

10. The method according to claim 9, further comprising:
    transmitting information to the arrangement indicating that the arrangement is allocated as the proxy.

11. The method according to claim 10, wherein the information indicating that the arrangement is allocated as the proxy comprises information identifying the first instance of the function, and is transmitted at establishment of the flow associated with the device.

12. The method according to claim 10, wherein the information indicating that the arrangement is allocated as the proxy comprises information identifying the second instance of the function, and is transmitted when instructing the first instance of the function to relocate.

13. A method for enabling relocation of a function for processing data packets of a flow associated with a device configured to operate in a communication system, the method being performed in a first instance of the function for processing the data packets of the flow, the method comprising:
    transmitting information to an arrangement indicating that the arrangement is allocated as a proxy for control messages exchanged between the first instance and a control instance controlling how the function processes the data packet;
    receiving an instruction to relocate the function for processing the data packets to a second instance, the instruction being received from an apparatus controlling the relocation; and
    transmitting information to the second instance of the function for processing the data packets, the information identifying the arrangement allocated as the proxy.

14. The method according to claim 13, further comprising:
    transmitting information to the arrangement indicating that the function for processing the data packets is relocated from the first instance to the second instance of the function for processing the data packets.

15. The method according to claim 13, further comprising:
    transmitting information to the apparatus controlling the relocation, the information identifying the arrangement allocated as the proxy.

16. The method according to claim 1, wherein the communication network is a wireless communication network, and the device is a wireless device.

17. An arrangement for a communication system, wherein the arrangement comprises a processor configured to enable relocation of a function for processing data packets of a flow associated with a device, and wherein the arrangement is configured to be allocated as a proxy for control messages exchanged between the function and a control instance controlling how the function processes the data packets of the flow, the processor further configured to:
    store first contact information for the function, said first contact information for identifying a first location of the function;
    obtain information indicating that the function has been relocated from the first location to a second location, wherein the information comprises second contact information for the function, said second contact information for identifying the second location;
    store the second contact information for the function;
    after storing the second contact information for the function, receive a control message for the function that was transmitted by the control instance; and
    in response to receiving the control message, use the second contact information to forward the control message to the function, wherein
    the control message comprises information for controlling how the function processes the data packets of the flow.

18. The arrangement according to claim 17, the processor further configured to:
    receive information indicating that the arrangement is allocated as the proxy.

19. The arrangement according to claim 18, wherein the information indicating that the arrangement is allocated as the proxy comprises information identifying the second location.

20. The arrangement according to claim 18, the processor further configured to:
    receive the information indicating that the arrangement is allocated as the proxy from one of: an apparatus controlling the relocation of the function for processing the data packets; and the function for processing the data packets at the first location.

21. The arrangement according to claim 17, the processor further configured to:
    obtain the information indicating that the function for processing the data packets is relocated from one of the following: an apparatus controlling the relocation of the function for processing the data packets, the function at the first location, or the function at the second location.

22. The arrangement according to claim 17, wherein the arrangement is configured to be co-located with an apparatus controlling the relocation of the function for processing the data packets and to be allocated as the proxy at establishment of the flow.

23. The arrangement according to claim 17, wherein the arrangement is configured to be co-located with the first location of the function, and further configured to be allocated as the proxy when obtaining the information indicating that the function for processing the data packets is relocated.

24. The arrangement according to claim 17, the processor further configured to forward control messages by one of the following:
transparent forwarding of the control messages,
termination of a lower level of an interface related to the control message and
transparent relaying of the control messages,
decoding and forwarding of the control messages, and
decoding and modification of the control messages before forwarding.

25. An apparatus for a communication system, wherein the apparatus comprises a processor configured to enable relocation of a function for processing data packets of a flow associated with a device configured to operate in the communication system, control the relocation of the function for processing the data packets, and be connectable to an arrangement allocated as a proxy for control messages exchanged between an instance of the function for processing the data packets and a control instance controlling how the function processes the data packet, the processor further configured to:
instruct a first instance of the function for processing the data packets to relocate the function to a second instance,
transmit information to the arrangement indicating that the function for processing the data packets is relocated from the first instance to the second instance, wherein the arrangement is configured to exchange control messages between the control instance and the second instance, and wherein the control messages comprise information indicating how the function processes the data packets of the flow; and
transmit information to the second instance of the function for processing the data packets, the information identifying the arrangement allocated as the proxy.

26. The apparatus according to claim 25, the processor further configured to:
transmit information to the arrangement indicating that the arrangement is allocated as the proxy.

27. The apparatus according to claim 26, the processor further configured to:
transmit the information to the arrangement indicating that the arrangement is allocated as the proxy at establishment of the flow associated with the device, wherein the information comprises information identifying the first instance of the function.

28. The apparatus according to claim 26, the processor further configured to:
transmit the information to the arrangement indicating that the arrangement is allocated as the proxy when instructing the first instance of the function to relocate, wherein the information comprises information identifying the second instance of the function.

29. A first instance apparatus of a function for processing the data packets of a flow associated with a device configured to operate in a communication system, wherein the first instance apparatus comprises a processor configured to enable relocation of the function for processing data packets of a flow, the processor further configured to:
transmit information to an arrangement indicating that the arrangement is allocated as a proxy for control messages exchanged between the first instance and a control instance controlling how the function processes the data packet;
receive an instruction to relocate the function for processing the data packets to a second instance, the instruction being received from an apparatus controlling the relocation;
transmit information to the second instance of the function for processing the data packets, the information identifying the arrangement allocated as the proxy.

30. The first instance apparatus according to claim 29, the processor further configured to:
transmit information to the arrangement indicating that the function for processing the data packets is relocated from the first instance to the second instance of the function for processing the data packets.

31. The first instance apparatus according to claim 29, the processor further configured to:
transmit information to the apparatus controlling the relocation, the information identifying the arrangement allocated as the proxy.

32. A non-transitory computer readable medium comprising computer readable code which when run on an arrangement causes the arrangement to perform a method as claimed in claim 1.

33. A non-transitory computer readable medium comprising computer readable code which when run on an apparatus causes the apparatus to perform a method as claimed in claim 9.

34. A non-transitory computer readable medium comprising computer readable code which when run on an instance of a function for processing the data packets of a flow causes the instance to perform a method as claimed in claim 13.

35. A computer program product comprising a non-transitory computer readable medium and a computer program according to claim 32, wherein the computer program is stored on the computer readable medium.

* * * * *